US011869098B2

(12) United States Patent
Privitelli et al.

(10) Patent No.: US 11,869,098 B2
(45) Date of Patent: Jan. 9, 2024

(54) METHODS AND SYSTEMS FOR PRESENTING INFORMATION

(71) Applicant: Lemon Inc., Grand Cayman (KY)

(72) Inventors: Anthony Privitelli, Culver City, CA (US); Chris Weigele, Culver City, CA (US); Michael Buzinover, Culver City, CA (US)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 17/472,350

(22) Filed: Sep. 10, 2021

(65) Prior Publication Data
US 2023/0083474 A1    Mar. 16, 2023

(51) Int. Cl.
| | | |
|---|---|---|
| *G06F 3/048* | (2013.01) |
| *G06Q 50/00* | (2012.01) |
| *G06F 3/0482* | (2013.01) |
| *G06F 16/9536* | (2019.01) |

(52) U.S. Cl.
CPC .......... *G06Q 50/01* (2013.01); *G06F 3/0482* (2013.01); *G06F 16/9536* (2019.01); *G06F 2203/04803* (2013.01)

(58) Field of Classification Search
CPC ...................................................... G06Q 50/01
See application file for complete search history.

(56) References Cited

U.S. PATENT DOCUMENTS

| | | |
|---|---|---|
| D513,511 S | 1/2006 | Decombe |
| D603,418 S | 11/2009 | Magnani et al. |
| D771,061 S | 11/2016 | Zhu |
| D772,259 S | 11/2016 | Pahwa et al. |

(Continued)

FOREIGN PATENT DOCUMENTS

| | | |
|---|---|---|
| CN | 303159633 | 4/2015 |
| CN | 303959369 S | 12/2016 |

(Continued)

OTHER PUBLICATIONS

"TikTok App GUI Sketch Resource"; SketchFav; Dec. 2020; retrieved from Internet Jun. 13, 2023; https://sketchfav.com/en/sketch/tiktok-app-ui-screens-mockup-sketch-freebie-resource; 2020; 2 pages.

(Continued)

*Primary Examiner* — Claudia Dragoescu
(74) *Attorney, Agent, or Firm* — BakerHostetler

(57) ABSTRACT

The present disclosure describes techniques for presenting information associated with content creators. The techniques comprise receiving information about a first subset of users selected based on information about a first users, displaying information about a second user among the first subset of users in a first area of a user interface, displaying information about a plurality of users among a second subset of users in a second area of the user interface while displaying the information about the second user in the first area, determining that the first user has a desire to review information about a third user among the first subset of users based on user input, displaying information about the third user in the first area, and displaying information about a plurality of users among a third subset of users in the second area while displaying the information about the third user in the first area.

20 Claims, 15 Drawing Sheets

(56) References Cited

U.S. PATENT DOCUMENTS

| | | | |
|---|---|---|---|
| 9,538,223 B1* | 1/2017 | Dahley | H04N 21/4788 |
| D786,274 S | 5/2017 | Lee et al. | |
| D797,797 S | 9/2017 | Gandhi et al. | |
| D904,450 S | 12/2020 | Jacoby et al. | |
| D916,107 S | 4/2021 | Farhadovich-Shalinski | |
| D927,521 S | 8/2021 | Hartman et al. | |
| D928,190 S | 8/2021 | Hartman et al. | |
| D938,992 S | 12/2021 | Machniewska | |
| D944,828 S | 3/2022 | Underwood et al. | |
| D976,271 S | 1/2023 | Chen | |
| D979,586 S | 2/2023 | Song | |
| 2012/0054666 A1 | 3/2012 | Baird-Smith et al. | |
| 2012/0253795 A1* | 10/2012 | Andrews | G10L 15/26 704/201 |
| 2014/0047361 A1* | 2/2014 | Gaspar | G06F 3/04817 715/762 |
| 2016/0018978 A1 | 1/2016 | Zenoff | |
| 2016/0202879 A1* | 7/2016 | Chen | H04L 51/52 715/753 |
| 2019/0342616 A1* | 11/2019 | Domm | G06Q 50/01 |
| 2021/0019839 A1 | 1/2021 | Su et al. | |

FOREIGN PATENT DOCUMENTS

| | | |
|---|---|---|
| CN | 306761296 S | 8/2021 |
| JP | HJ2810131700 | 8/2016 |
| JP | HJ2817073400 | 3/2017 |
| JP | HJ3015558700 | 1/2019 |
| JP | HJ3115508700 | 12/2019 |
| JP | HJ3116942300 | 1/2020 |
| JP | RJ0312139700 | 3/2021 |
| JP | RJ0310608100 | 5/2021 |
| JP | RJ0309946900 | 8/2021 |
| JP | 1723426 S | 8/2022 |
| KR | 30-1121220 | 7/2021 |

OTHER PUBLICATIONS

J. Constine; "Zuckerberg misunderstands the huge threat of TikTok:"; TechCrunch; Oct. 2019; retrieved from Internet Jun. 13, 2023; https://techcrunch.com/2019/10/01/instagram-vs-tiktok; 2019; 3 pages.
International Patent Application No. PCT/SG2022/050605; Int'l Search Report; dated Apr. 5, 2023; 2 pages.

* cited by examiner

1100

Receive information about a first subset of users, wherein the first subset of users is selected based on a likelihood that a first user would find them of interest according to information about the first user 1102

Display information about a second user among the first subset of users in a first area of a user interface 1104

Display information about a plurality of users among a second subset of users in a second area of the user interface while displaying the information about the second user in the first area of the user interface 1106

Determine that the first user has a desire to review information about a third user among the first subset of users based on user input, wherein the third user is different from the second user 1108

Display information about the third user among the first subset of users in the first area of the user interface in response to a determination that the first user has the desire to review the information about the third user 1110

Display information about a plurality of users among a third subset of users in the second area of the user interface while displaying the information about the third user in the first area of the user interface, wherein the third subset of users is associated with the third user 1112

```
┌─────────────────────────────────────────────────────────────────────┐
│ Receive information about a first subset of users, wherein the first │
│ subset of users is selected based on a likelihood that a first user  │
│ would find them of interest according to information about the       │
│ first user  1202                                                     │
└─────────────────────────────────────────────────────────────────────┘
                                  ↓
┌─────────────────────────────────────────────────────────────────────┐
│ Display information about a second user among the first subset of    │
│ users in a first area of a user interface  1204                      │
└─────────────────────────────────────────────────────────────────────┘
                                  ↓
┌─────────────────────────────────────────────────────────────────────┐
│ Display information about a plurality of users among a second subset │
│ of users in a second area of the user interface while displaying the │
│ information about the second user in the first area of the user      │
│ interface  1206                                                      │
└─────────────────────────────────────────────────────────────────────┘
                                  ↓
┌─────────────────────────────────────────────────────────────────────┐
│ Determine that the first user has a desire to review information     │
│ about a different plurality of users among the second subset of      │
│ users based on user input  1208                                      │
└─────────────────────────────────────────────────────────────────────┘
                                  ↓
┌─────────────────────────────────────────────────────────────────────┐
│ Display information about the different plurality of users among the │
│ second subset of users in the second area of the user interface      │
│ while displaying the information about the second user in the first  │
│ area of the user interface  1210                                     │
└─────────────────────────────────────────────────────────────────────┘
                                  ↓
┌─────────────────────────────────────────────────────────────────────┐
│ Determine that the first user has a desire to review information     │
│ about a third user among the first subset of users based on user     │
│ input, wherein the third user is different from the second user 1212 │
└─────────────────────────────────────────────────────────────────────┘
                                  ↓
┌─────────────────────────────────────────────────────────────────────┐
│ Display information about the third user among the first subset of   │
│ users in the first area of the user interface in response to a       │
│ determination that the first user has the desire to review the       │
│ information about the third user 1214                                │
└─────────────────────────────────────────────────────────────────────┘
                                  ↓
┌─────────────────────────────────────────────────────────────────────┐
│ Display information about a plurality of users among a third subset  │
│ of users in the second area of the user interface while displaying   │
│ the information about the third user in the first area of the user   │
│ interface, wherein the third subset of users is associated with the  │
│ third user 1216                                                      │
└─────────────────────────────────────────────────────────────────────┘
```

Display a profile image of the second user and content associated with the second user, the profile image overlaid above the content 1302

Automatically play the content when the information about the second user is displayed in the first area of the user interface 1304

Display an interface element adjacent to the profile image of the second user 1306

Change a status of the interface element in response to receiving user input on the interface element 1308

FIG. 13

METHODS AND SYSTEMS FOR PRESENTING INFORMATION

BACKGROUND

Communication is increasingly being conducted using Internet-based tools. The Internet-based tools may be any software or platform. Existing social media platforms enable users to communicate with each other by sharing images, videos, and other information via app or web pages. As communication devices, such as mobile phones, become more sophisticated, people continue to desire new ways for entertainment, social networking, and communication.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 11 show an example process for presenting information associated with content creators, which may be performed by a user device in accordance with the present disclosure.

FIG. 12 show an example process for presenting information associated with content creators, which may be performed by a user device in accordance with the present disclosure.

FIG. 13 show an example process for presenting information associated with content creators, which may be performed by a user device in accordance with the present disclosure.

DETAILED DESCRIPTION OF ILLUSTRATIVE EMBODIMENTS

Figure 1:
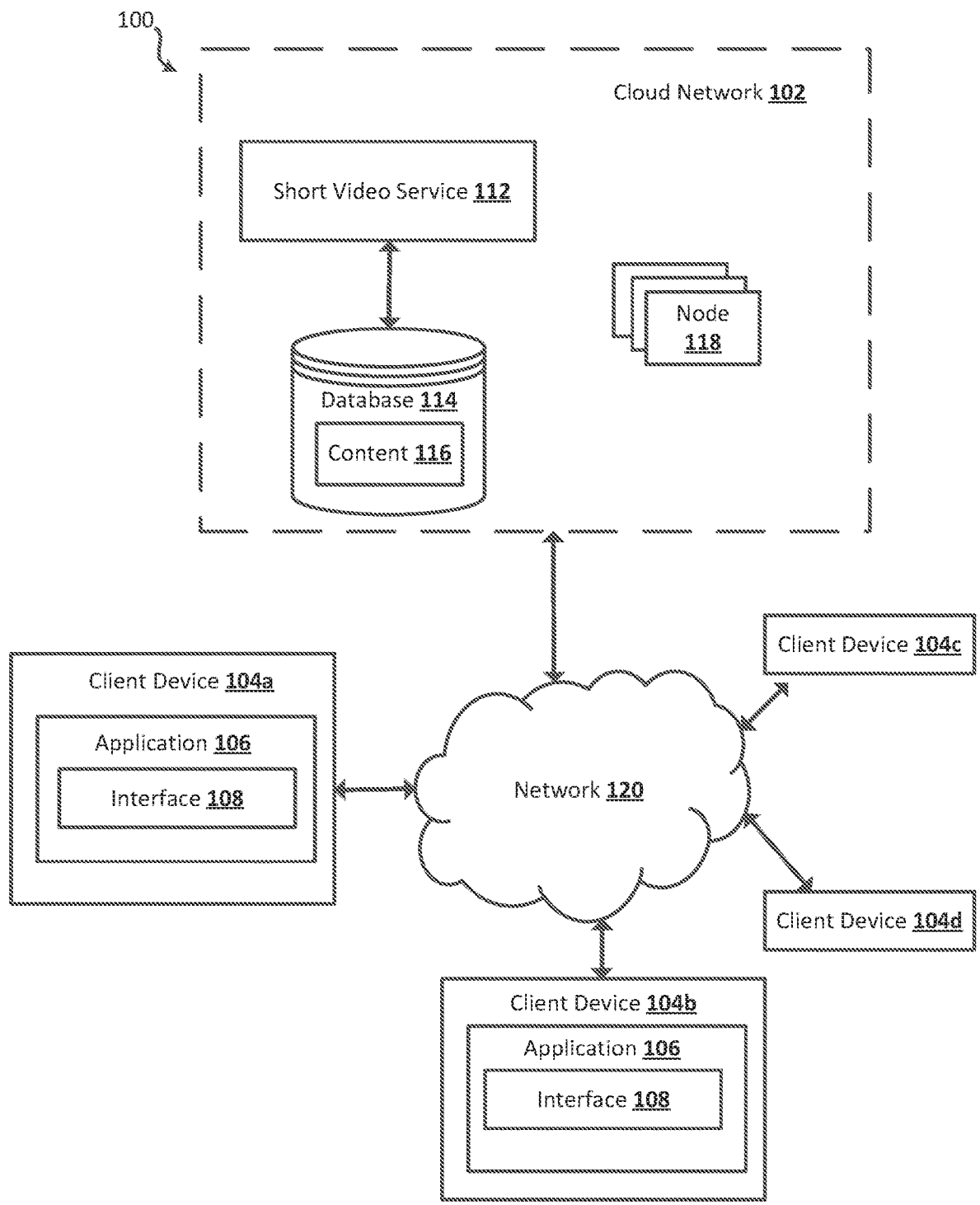
FIG. 1 shows an example system for distributing content.

FIG. 1 illustrates an example system 100 for distributing content. The system 100 may comprise a cloud network 102 and a plurality of client devices 104a-d. The cloud network 102 and the plurality of client devices 104a-d may communicate with each other via one or more networks 120.

The cloud network 102 may be located at a data center, such as a single premise, or be distributed throughout different geographic locations (e.g., at several premises). The cloud network 102 may provide the services via the one or more networks 120. The network 120 may comprise a variety of network devices, such as routers, switches, multiplexers, hubs, modems, bridges, repeaters, firewalls, proxy devices, and/or the like. The network 120 may comprise physical links, such as coaxial cable links, twisted pair cable links, fiber optic links, a combination thereof, and/or the like. The network 120 may comprise wireless links, such as cellular links, satellite links, Wi-Fi links and/or the like.

The cloud network 102 may comprise a plurality of computing nodes 118 that host a variety of services. In an embodiment, the nodes 118 host a video service 112. The video service 112 may comprise a content streaming service, such as an Internet protocol video streaming service. The video service 112 may be configured to distribute content 116 via a variety of transmission techniques. The video service 112 is configured to provide the content 116, such as video, audio, textual data, a combination thereof, and/or the like. The content 116 may comprise content streams (e.g., video stream, audio stream, information stream), content files (e.g., video file, audio file, text file), and/or other data. The content 116 may be stored in a database 114. For example, the video service 112 may further comprise a video sharing service, a video hosting platform, a content distribution platform, a collaborative gaming platform, and/or the like.

In an embodiment, the content 116 distributed or provided by the video service 112 comprises multiple videos. The videos, e.g., short videos, may have a duration less than or equal to a predetermined time limit, such as 15 seconds, 30 seconds, one minute, five minutes, or other predetermined minutes. By way of example and without limitation, the short videos may comprise at least one, but no more than four, 15 second segments strung together. The short duration of the videos may provide viewers with quick bursts of entertainment that allow users to watch a large quantity of videos in a short time frame.

The short videos may comprise a pre-recorded audio overlay, such as a clip of a pre-recorded song or audio from a television show or movie. If a short video comprises a pre-recorded audio overlay, the short video may feature one or more individuals lip-syncing, dancing, or otherwise moving their body along with the pre-recorded audio. For example, a short video may feature an individual completing a "dance challenge" to a popular song or a short video may feature two individuals participating in a lip-syncing or dancing duet. As another example, a short video may feature an individual completing a challenge that requires them to move his or her body in a manner that corresponds to the pre-recorded audio overlay, such as in a manner that corresponds to the beat or rhythm of the pre-recorded song featured by the pre-recorded audio overlay. Other short videos may not comprise a pre-recorded audio overlay. For example, these short videos may feature an individual playing sports, pulling pranks, or giving advices, such as beauty and fashion advices, cooking tips, or home renovation tips, etc.

In an embodiment, the content 116 may be output to different client devices 104 via the network 120. The content 116 may be streamed to the client devices 104. The content stream may be a stream of short videos received from the video service 112. The plurality of client devices 104 may be configured to access the content 116 from the video service 112. In an embodiment, a client device 104 may comprise an application 106. The application 106 outputs (e.g., display, render, present) the content 116 to a user associated with the client device 104. The content may comprise videos, audio, comments, textual data and/or the like.

The plurality of client devices 104 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 104 may be associated with one or more users. A single user may use one or more of the plurality of client devices 104 to access the cloud network 102. The plurality of client devices 104 may travel to a variety of locations and use different networks to access the cloud network 102.

The video service 112 may be configured to receive input from users. The users may be registered as users of the video service 112 and may be users of the content application 106 operating on client devices 104. The user inputs may include short videos created by users, user comments associated with short videos, or "likes" associated with short videos. The user inputs may include connection requests and user input data, such as text data, digital image data, or user content. The connection requests may comprise requests from the client devices 104a-d to connect to the video service 112. The user input data may include information, such as short videos and/or user comments, that the users connected to the video service 112 want to share with other connected users of the video service 112.

The video service 112 may be able to receive different types of input from users using different types of client devices 104. For example, a user using the application 106 on a first user device, such as a mobile phone or tablet, may be able to create and upload short videos using the application 106. A user using the application 106 on a different mobile phone or tablet may also be able to view, comment on, or "like" short videos or comments written by other users. In another example, a user using the application 106 on a smart television, laptop, desktop, or gaming device may not be able to create and upload short videos or comment on short videos using the application 106. Instead, the user using the content application 106 on a smart television, laptop, desktop, or gaming device may only be able to use the application 106 to view short videos, view comments left by other users, and "like" short videos.

In an embodiment, a user may use the application 106 on a client device 104 to create a short video and upload the short video to the cloud network 102. The client devices 104 may access an interface 108 of the application 106. The interface 108 may comprise an input element. For example, the input element may be configured to allow users to create the short video. To create the short video, the user may give the application 106 permission to access an image capture device, such as a camera, or a microphone of the client device 104. Using the application 106, the user may select a duration for the short video or set a speed for the short video, such as "slow-motion" or "speed things up."

The user may edit the short video using the application 106. The user may add one or more texts, filters, sounds, or effects, such as beauty effects, to the short video. To add a pre-recorded audio overlay to the short video, the user may select a song or sound clip from a sound library of the application 106. The sound library may include different songs, sound effects, or audio clips from movies, albums, and television shows. In addition to or in lieu of adding a pre-recorded audio overlay to the short video, the user may use the application 106 to add a voice-over to the short video. The voice-over may be a sound recorded by the user using a microphone of the client device 104. The user can add a text overlay to the short video and may use the application 106 to specify when they want the text overlay to appear in the short video. The user may assign a caption, and one or more hashtags to the short video to indicate the subject matter of the short video. The application 106 may prompt the user to select a frame of the short video to use as a "cover image" for the short video.

After the user has created the short video, the user may use the application 106 to upload the short video to the cloud network 102 and/or to save the short video locally to the user device 104. When a user uploads the short video to the cloud network 102, they may choose whether they want the short video to be viewable by all other users of the application 106 or viewable by only a subset of the users of the application 106. The video service 112 may store the uploaded short videos and any metadata associated with the short videos in one or more databases 114.

In an embodiment, a user may use the application 106 on a client device 104 to provide input on a short video. The client devices 104 may access an interface 108 of the content application 106 that allows users to provide input associated with short videos. The interface 106 may comprise an input element. For example, the input element may be configured to receive input from a user, such as comments or "likes" associated with a particular short video. If the input is a comment, the application 106 may allow a user to set an emoji associated with his or her input. The application 106 may determine timing information for the input, such as when a user wrote a comment. The application 106 may send the input and associated metadata to the cloud network 102. For example, the content application 106 may send a comment, an identifier of the user that wrote the comment, and the timing information for the comment to the cloud network 102. The video service 112 may store the input and associated metadata in the database 114.

The video service 112 may be configured to output the uploaded short videos and user input to other users. The users may be registered as users of the video service 112 to view short videos created by other users. The users may be users of the application 106 operating on client devices 104. The application 106 may output (display, render, present) the short videos and user comments to a user associated with a client device 104. The client devices 104 may access an interface 108 of the application 106. The interface 108 may comprise an output element. The output element may be configured to display information about different short videos so that a user can select a short video to view. For example, the output element may be configured to display a plurality of cover images, captions, or hashtags associated with the short videos. The output element may also be configured to arrange the short videos according to a category associated with each short video.

In an embodiment, the user comments associated with a short video may be output to other users watching the same short video. For example, all users accessing a short video may view comments associated with the short video. The video service 112 may output the short video and the associated comments simultaneously. Comments may be output by the video service 112 in real-time or near-real-time. The application 106 may display the short videos and comments in various ways on the client device 104. For example, the comments may be displayed in an overlay above the content or in an overlay beside the content. As another example, a user that wants to view other users' comments associated with a short video may need to select a button in order to view the comments. The comments may be animated when displayed. For example, the comments may be shown scrolling across the short video or across the overlay.

The plurality of computing nodes 118 may process tasks associated with the video service 112. The plurality of computing nodes 118 may be implemented as one or more computing devices, one or more processors, one or more virtual computing instances, a combination thereof, and/or the like. The plurality of computing nodes 118 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

In an embodiment, registered users of the video service 112 may each be associated with a profile. For example, when an individual wants to become a registered user of video service, the individual may provide, to the video service 112, information associated with the individual. Some or all of this information may be used to generate and/or populate a profile associated with the individual. The individual may become a registered user of the video service 112 after a profile associated with the individual is generated and/or populated.

A registered user of the video service 112 may be more interested in certain content being created and uploaded to the video service 112 than other content. For example, a registered user of the video service 112 may prefer watching short videos featuring an individual dancing to pop music rather than short videos featuring an individual providing home improvement tips. The registered user of the video service 112 may "follow" other registered users of the video service 112 that typically create content of interest to the registered user. If the registered user of the video service 112 "follows" other registered users of the video service 112 that typically create content of interest to the registered user, those "followed" users may be stored in a database, such as the database 114, associated with the registered user.

If the registered user of the video service 112 "follows" other registered users of the video service 112 that typically create content of interest to the registered user, the registered user may easily view, via the interface 108 of the content application 106, the content uploaded to the video service 112 by the followed users. For example, the content uploaded to the video service 112 by the followed users may automatically be displayed on a feed on the interface 108 of the content application 106.

The video service 112 may be configured to present, to a registered user of the video service 112, other registered users of the video service 112. For example, the video service 112 may be configured to present, to a first registered user of the video service 112, other registered users. The video service 112 may present these other registered users by causing output, via the interface 108, of information associated with the presented users and/or the presented users' profiles. For example, the video service 112 may present these other registered users by causing output of one or more of a profile photo, username, or name associated with each other registered user. The first registered user may select to follow some, all, or none of these recommended users that are presented.

In an embodiment, the video service 112 may be configured to present, to a first registered user of a client device 104, a first subset of other registered users, so that the first registered user can follow the presented first subset of other registered users. The first subset of other registered users may include any number of other registered users. Each registered user of the first subset may create and upload content, such as short videos, to the video service 112.

The video service 112 may be configured to output the first subset of registered users via the interface 108. For example, the first registered user may be able to use one or more client devices 104 to view the first subset of registered users via the interface 108. The first subset of registered users may be organized in any manner on the interface 108. For example, the first subset of registered users may be organized in a list or in an array.

In an embodiment, the first subset of registered users may be organized in a carousel on a first area of the interface 108. The first registered user may be able to swipe through the registered users in the first subset of registered users, one-by-one. For example, the first registered user may use his or her finger and/or a tool to swipe left or right on the interface 108. As the first registered user swipes left or right on the interface 108, different images associated with the users of the first subset of registered users may be appeared on the first area of the interface 108. For example, information associated with the profiles (e.g., photos, username, etc.) of the first subset of registered users may be appeared on the first area of the interface 108 as the first registered user swipes through the carousel. As another example, a preview of the content created by the first subset of registered users may appear on the first area of the interface 108 as the first registered user swipes through the carousel. In particular, a short video or a portion of a short video created by each of the registered users in the first subset may be played back (e.g., output) on the first area of the interface 108 as the first registered user swipes through the carousel. Profile information and a content preview may be displayed together for each of the registered users in the first subset as the first registered user swipes through the carousel.

In an embodiment, the video service 112 may be configured to present, to the first registered user, additional registered users that are similar to each registered user of the first subset of selected users on the second area of the interface 108. For example, if the first subset of registered users comprises ten registered users, the video service 112 may provide multiple groups of additional registered users that are similar to the first subset of registered users, respectively. The video service 112 may provide any number of additional registered users in each set that are similar to each of first subset of selected users. For example, if the first subset of registered users comprises ten registered users, the video service 112 may provide six (or any other number) additional registered users that are similar to each of the ten registered users. This may result in a large quantity of provided users, and the first registered user is more likely to be able to find users of interest to follow.

The video service 112 may determine additional multiple groups of registered users that are respectively similar to the first subset of selected users in a variety of different ways. For example, a group of additional registered users may be similar to a registered user of the first subset of selected users based on information associated with the registered user of the first subset of selected user's profile. For example, the additional registered users may include those users that have similar followers, make similar content, and/or are associated with similar profile information (e.g., descriptive biography, etc.) of the registered user of the first subset of selected users.

The additional registered users that are similar to each registered user of the first subset of selected users may be organized in a carousel on a second area of the interface 108. For example, each group of additional registered users that are similar to each registered user of the first subset of selected users may be organized in a carousel (e.g., second carousel) that is different than the carousel (e.g., first carousel) in which the first subset of registered users is organized. If each group of the additional registered users that are similar to each registered user of the first subset of selected users are organized in a second carousel on the interface 108, the first registered user may be able to swipe through the additional registered users, one-by-one, and accordingly, different groups of the additional registered users can be presented in the second carousel in accordance with the swiping of the first registered user. For example, the first registered user may use his or her finger and/or a tool to swipe left or right on the interface 108. As the first registered user swipes left or right on the interface 108, different additional registered users may appear on the interface 108. As each group of the additional registered users is similar to each registered user, when a register user is presented in first carousel, the group of the additional registered users that is similar to the registered user is presented in the second carousel, and a corresponding group of the additional registered users that is similar to the registered users presented in the first carousel can be presented in the second carousel. For example, information associated with the profiles (e.g., photo, username, etc.) of the additional registered users may appear in the first carousel on the first area of the interface 108 as the first registered user swipes through the first carousel.

In an embodiment, the first carousel and the second carousel may be simultaneously displayed on the interface. The first carousel may be displayed in a first portion of the interface 108 while a second carousel is displayed in a second portion of the interface 108. The first portion may be a top portion, bottom portion, right portion, left portion, etc. of the interface 108. The second portion may be any portion of the interface 108 that is different than the first portion. By simultaneously displaying the first carousel and a second carousel on the same interface 108, the first registered user may be more easily able to find users to follow. In embodiments, the first subset of registered users can be presented in the first carousel, and the groups of the additional registered users can be presented in the second carousel. In embodiments, each of the first subset of the registered users can be presented in a form of image card with a profile image displayed over a video that may be generated by the particular user. In embodiments, each user of the groups of the additional registered users can be presented in a form of image card with a profile image displayed over a static background. In embodiments, the image card of each of the first subset of the registered users is larger that the image card of each user of the groups of the additional registered users.

For example, users A, B, and C may belong to the first subset of registered users and each of users A, B, and C may be associated with ten additional registered users (e.g. similar users). The first registered user may swipe through users A, B, and C one-by-one in the first carousel. A second carousel including the ten additional registered users associated with User A may be displayed in the second portion of the interface 108 while User A is selected in the first carousel. As the first registered user swipes to view User B in the first carousel, a second carousel including the ten additional registered users associated with User B may be displayed in the second portion of the interface 108. Similarly, as the first registered user swipes to view User C in the first carousel, a second carousel including the ten additional registered users associated with User C may be displayed in the second portion of the interface 108.

Figure 2A:
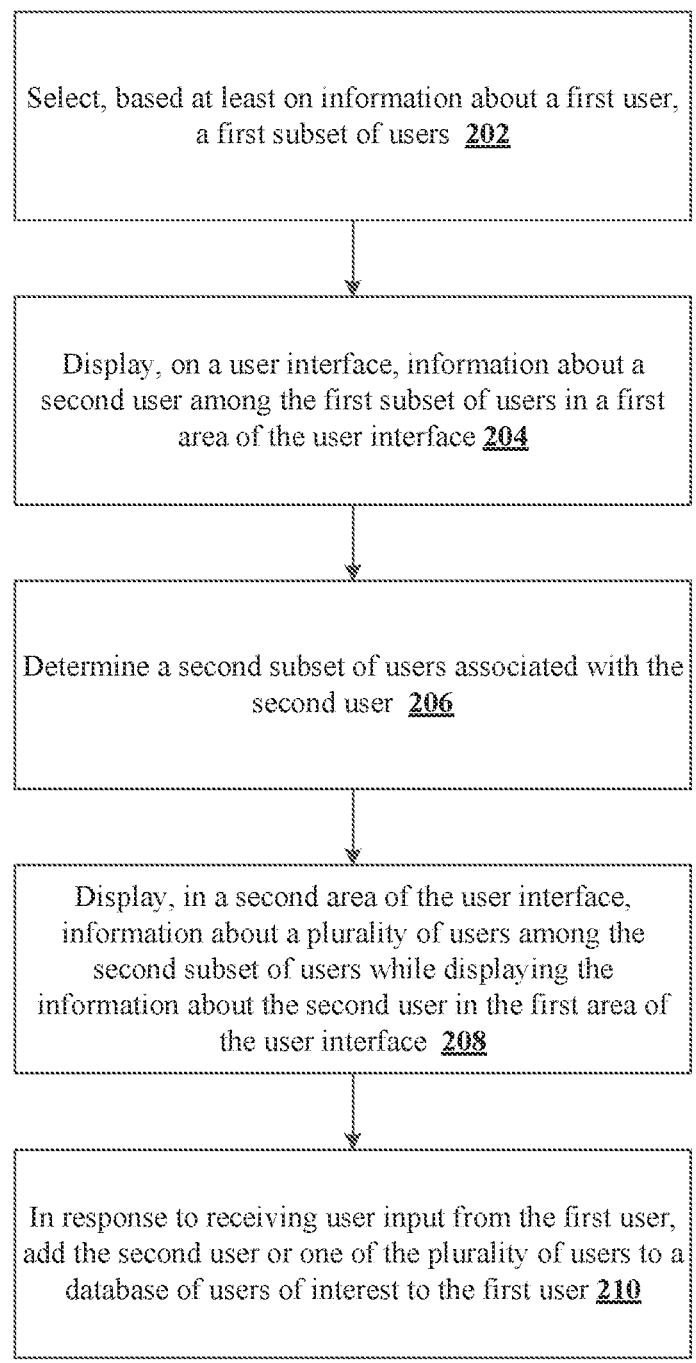
FIG. 2A and FIG. 2B show an example process for presenting information associated with content creators, which may be performed by a user device in accordance with the present disclosure.
Figure 2B:
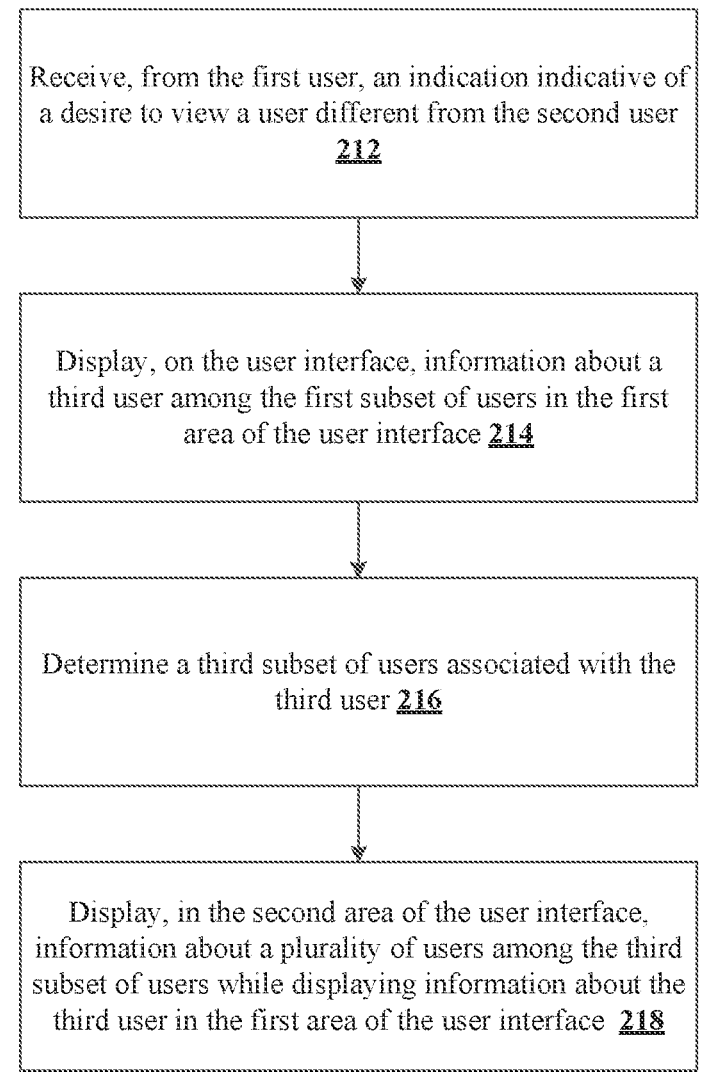

FIGS. 2A-B illustrate an example process 200 that may be performed by an application installed on a user device (e.g., the application 106 installed on the client device 104) and/or a video service (e.g., the video service 112). Although depicted as a sequence of operations in FIG. 2, those of ordinary skill in the art will appreciate that various embodiments may add, remove, reorder, or modify the depicted operations.

At 202, a first subset of users may be selected and/or determined based on information associated with a first user. This operation may be performed by a video service or an application on a user device. In some examples, an application installed on a user device (e.g., the application 106 installed on the client device 104) may be configured to select a first subset of users based on information about a first user. In other examples, a video service (e.g., the video service 112) may be configured to provide, to a first user of the video service, a first subset of other users. The first subset may include any number of other users. Each user of the first subset may create and upload content, such as short videos, to the video service. The video service may determine the other users in the first subset based on information associated with the first user's profile.

For example, the video service may utilize some of all of the information that the first user provided to the video service when creating a profile. As discussed above, this information may include a username, a nickname, a short descriptive biography associated with the individual, etc. The first subset of users may include any number of users.

The video service may output (e.g., render, display) the first subset of users on an interface of a client device. The first user may utilize the client device to view the first subset of users via the interface. As discussed above, the first subset of users may be organized in any manner on the interface. For example, the first subset of users may be organized in a list or in an array.

In an embodiment, the first subset of users may be organized in a carousel on the interface. For example, the first subset of the users may be displayed in the first carousel on the first portion of the interface. The first user may be able to swipe through the users in the first subset, one-by-one. For example, the first user may use his or her finger and/or a tool to swipe left or right in the first carousel on the interface. As the first user swipes left or right on the interface, different users of the first subset of users may appear on the interface. For example, information associated with the profiles (e.g., photo, username, etc.) of the first subset of users may appear on the interface as the first user swipes through the first carousel. As another example, a preview of the content created by the first subset of users may appear on the interface as the first user swipes through the carousel. In particular, a short video or a portion of a short video created by each of the users in the first subset may be played back (e.g., output) on the interface as the first user swipes through the carousel. Profile information and a content preview may be displayed together for each of the users in the first subset as the first user swipes through the carousel. For example, the profile information can be displayed over the content preview.

At 204, information about a second user among the first subset of users may be displayed in a first area (e.g., portion) of the user interface. The information associated with the second user may include profile information (e.g., photo, username, etc.) associated with the second user. As another example, the information associated with the second user may include content created by the second user. In particular, a short video or a portion of a short video created by the second user may be played back (e.g., output) on the interface. Profile information and a content preview may be displayed together for the second user. The first area (e.g., portion) may be a top portion, bottom portion, right portion, left portion, etc. of the interface. An option to follow the second user may also be displayed in the first area of the user interface. For example, a button, that when selected causes the first user to follow the second user, may be displayed in the first area of the user interface.

At 206, a second subset of users associated with the second user may be selected and/or determined. This operation may be performed by a video service or an application on a user device. In some examples, an application installed on a user device (e.g., the application 106 installed on the client device 104) may be configured to select a second subset of users associated with the second user. In other examples, a video service (e.g., the video service 112) may be configured to determine the second subset of users associated with the second user. The video service may be configured to provide, to the first user, information about additional users that are similar to the first subset of users. The second subset of users may include any number of users. The second subset of users may include those users that are similar in some manner to the second user. For example, the second subset of users may include those users that have similar followers as the second user, make content that is similar to the content made by the second user, and/or are associated with similar profile information to the second user's profile (e.g., nickname, descriptive biography, etc.).

The second user and at least a portion of the second subset of users associated with the second user may be simultaneously displayed on the interface. At 208, information about a plurality of users among the second subset of users may be displayed in a second carousel of a second area (e.g., portion) of the user interface while the information about the second user is being displayed in the first carousel of the first area of the user interface. As discussed above, the first area (e.g., portion) may be a top portion, bottom portion, right portion, left portion, etc. of the interface. The second area may be any area or portion of the interface that is different from the first portion. The information about the plurality of users among the second subset of users may include information associated with the profiles (e.g., photo, username, etc.) of the plurality of users among the second subset of users.

An option to follow each user of the plurality of users among the second subset of users may also be displayed in the second area of the user interface. For example, a plurality of buttons may be displayed in the second area of the user interface. Each of the plurality of buttons may correspond to a particular user of the plurality of users among the second subset of users. When a particular button is selected, this may cause the first user to follow the corresponding user of the plurality of users among the second subset of users. By simultaneously displaying second user and at least a portion of the second subset of users on the same interface, the first user may be more easily able to find users of interest to follow.

The first user may follow one or more of the second user or at least one of the users of the plurality of users among the second subset of users. For example, the first user may select a button to follow the second user and/or at least one of the users of the plurality of users among the second subset of users. At 210, the second user and/or one of the plurality of users may be added to a database of users of interest to the first user. In some embodiments, the database may be locally stored on a user device (e.g., the client device 104). In other embodiments, the database may be remotely stored. For example, the database may include the database 114. The database of users of interest to the first user may be indicative of all users that the first user has followed. The video service and/or the user device may utilize the database of users of interest to the first user to determine/select content for output to the first user. For example, content created by the users indicated by the database may be automatically output (e.g., presented) to the first user on a feed via an interface of the application.

As an alternative to the first user following the second user and/or at least one of the users of the plurality of users among the second subset of users, the first user may choose not to follow the second user or any of the users of the plurality of users among the second subset of users. Regardless of whether the first user follows the second user and/or at least one of the users of the plurality of users among the second subset of users, the first user may want to view a different user from the first subset of users than the second user.

To view a different user from the first subset of users than the second user, the first user may interact with the interface. For example, the first user may swipe through the users in the first subset of users, one-by-one. At 212, an indication may be received, from the first user, to output/present a user that is different from the second user. For example, the first user may use his or her finger and/or a tool to swipe left or right on the interface. As the first user swipes left or right on the interface, different users of the first subset of users may appear on the interface. The information associated with the second user may begin to move off or disappear from the interface, and information associated with a new user may begin to move onto or appear on the interface.

At 214, information about a third user among the first subset of users may be displayed in the first area of the user interface. For example, information associated with the profile (e.g., photo, username, etc.) of the third user may appear on the interface as the first user swipes on the interface. As another example, a preview of the content created by the third user may appear on the interface as the first user swipes on the interface. In particular, a short video or a portion of a short video created by the third user may be played back (e.g., output) on the interface. Profile information and a content preview may be displayed together for the third user as the first user swipes on the interface. An option to follow the third user may also be displayed in the first area of the user interface. For example, a button, that when selected causes the first user to follow the third user, may be displayed in the first area of the user interface.

At 216, a third subset of users associated with the third user may be selected and/or determined. This operation may be performed by a video service or an application on a user device. In some examples, an application installed on a user device (e.g., the application 106 installed on the client device 104) may be configured to select a third subset of users associated with the third user. In other examples, a video service (e.g., the video service 112) may be configured to determine information about the third subset of users associated with the third user. The video service may be configured to provide, to the first user, information about additional users that are similar to the first subset of users. The third subset of users may include any number of users. The third subset of users may include those users that are similar in some manner to the third user. For example, the third subset of users may include those users that have similar followers as the third user, make content that is similar to the content made by the third user, and/or are associated with similar profile information to the third user's profile (e.g., nickname, descriptive biography, etc.).

The third user and at least a portion of the third subset of users associated with the third user may be simultaneously displayed on the interface. At 218, information about a plurality of users among the third subset of users may be displayed in the second area (e.g., portion) of the user interface while the information about the third user is being displayed in the first area of the user interface. As discussed above, the first area (e.g., portion) may be a top portion, bottom portion, right portion, left portion, etc. of the interface. The second area may be any area or portion of the interface that is different from the first portion. The information about the plurality of users among the third subset of users may include information associated with the profiles (e.g., photo, username, etc.) of the plurality of users among the third subset of users.

An option to follow each user of the plurality of users among the third subset of users may also be displayed in the second area of the user interface. For example, a plurality of buttons may be displayed in the second area of the user interface. Each of the plurality of buttons may correspond to a particular user of the plurality of users among the third subset of users. When a particular button is selected, this may cause the first user to follow the corresponding user of the plurality of users among the third subset of users. By simultaneously displaying the third user and at least a portion of the third subset of users on the same interface, the first user may be more easily able to find users of interest to follow.

The first user may continue interacting with the interface. For example, the first user may continue to swipe on the interface to view all of the users among the first subset of users and each of the corresponding subsets of users. The first user may choose to follow as many users as he or she wants. As the first user follows more users, the video service may automatically present content created/uploaded by the followed users to a client device of the first user.

Figure 3:
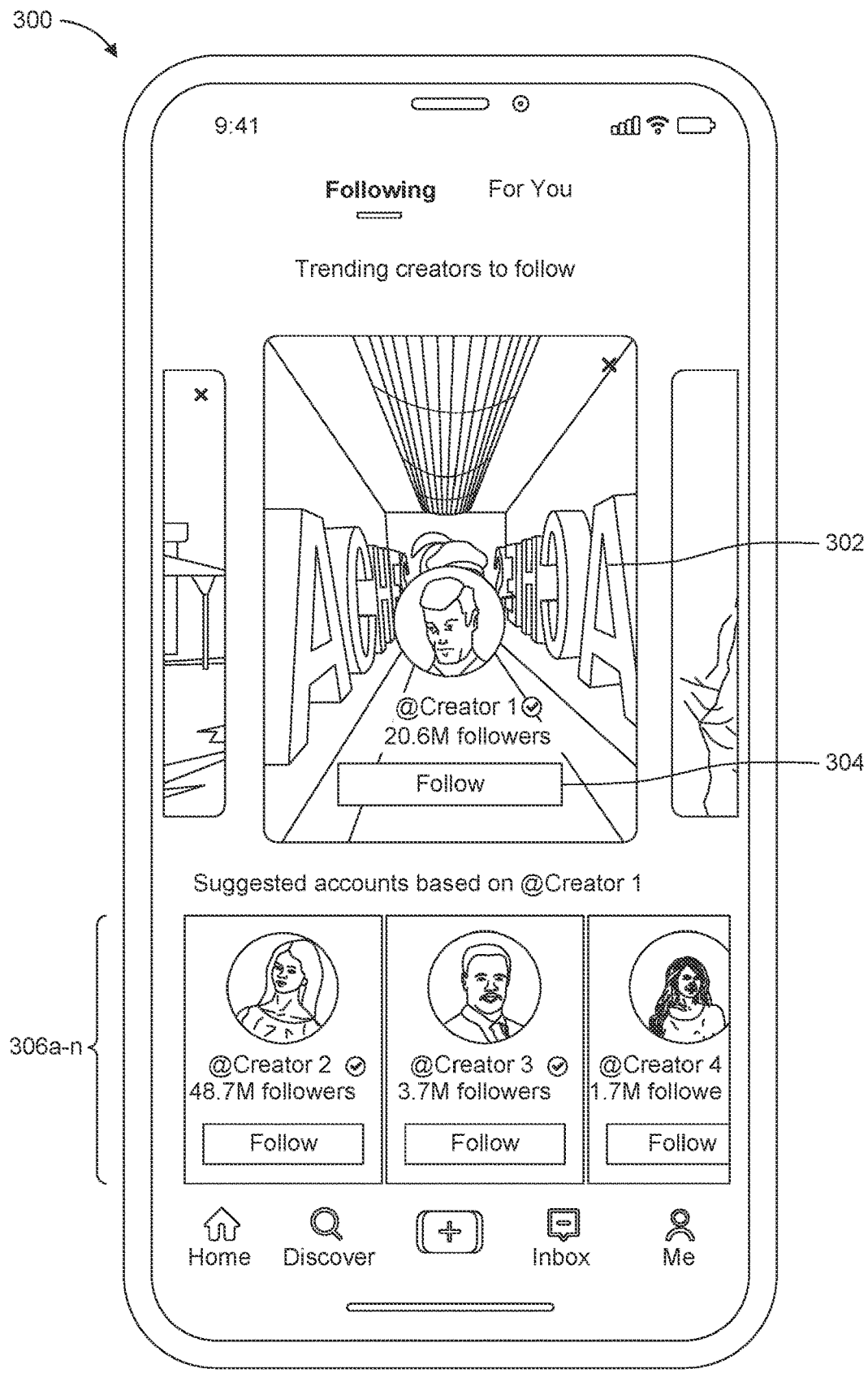
FIG. 3 shows an example user interface of presenting information associated with content creators in accordance with the present disclosure.

FIG. 3 illustrates an example UI 300 depicting presented users. The presented users may be registered users of a video service (e.g., the video service 112). The presented users may include users provided by the video service to a particular user of the video service (e.g., first user). For example, the presented users may include users that the video service presents the first user to follow. The first user may, for example, view the UI 300 shortly after registered as a user of the video service or at any timepoint when using the application 106. If the first user has just registered as a user of the video service, the first user may not follow many (or any) other users. The video service may provide the presented users to the first user so that the first user is able to begin following users of interest.

In an embodiment, the presented users include a first presented user 302. Information associated with the first presented user may be displayed on the UI 300. For example, profile information associated with the first presented user 302 may be displayed on the UI 300. The profile information may include a photo of the first presented user 302, a username, a name, a number of followers associated with the first presented user 302, and/or any other information associated with a profile of the first presented user 302. In addition to the profile information associated with the first presented user 302, a preview of the content created by the first presented user 302 may appear on the UI 300, such as behind the profile information associated with the first presented user 302.

Figure 4:
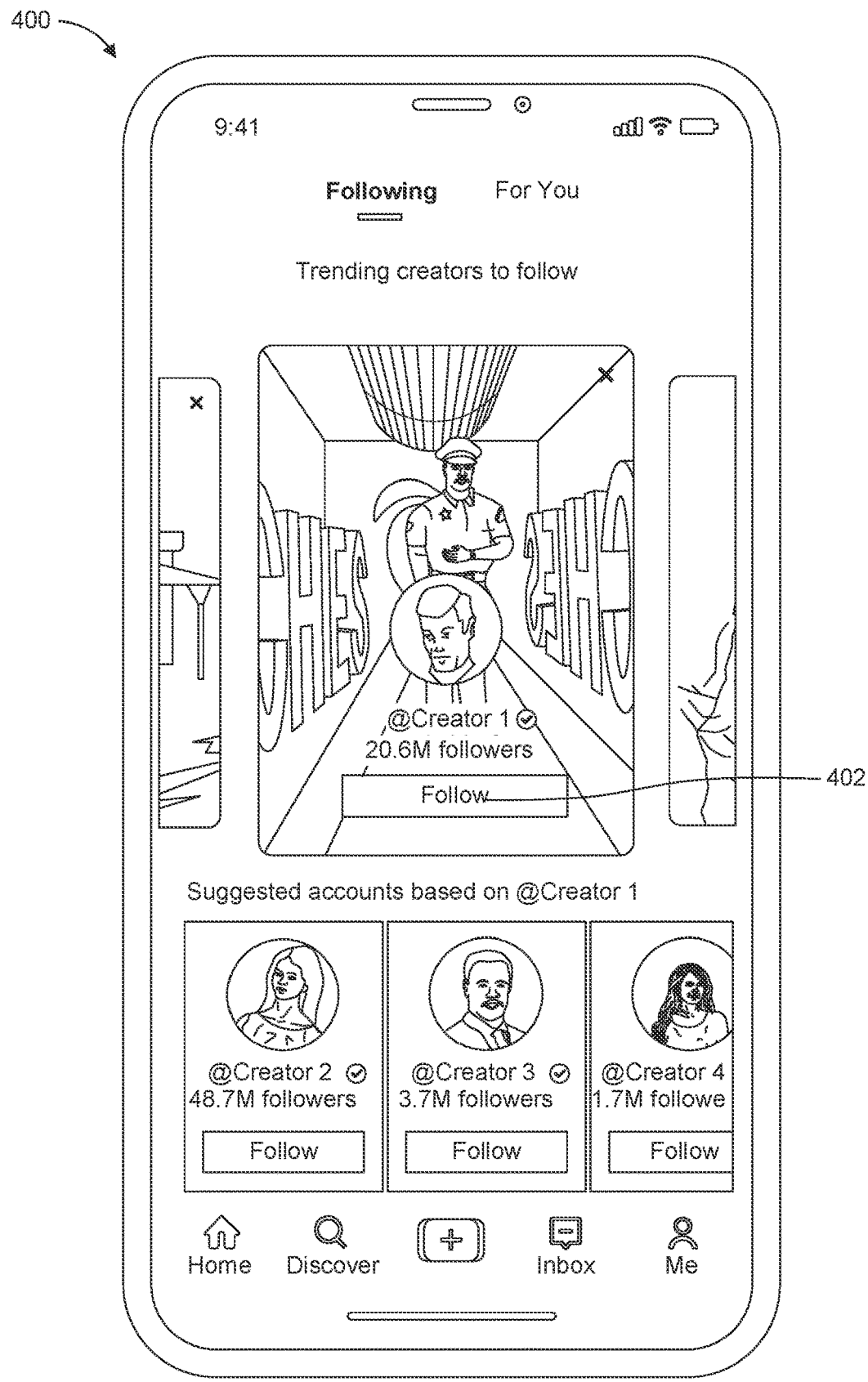
FIG. 4 shows another example user interface of presenting information associated with content creators in accordance with the present disclosure.

A button 304 may be displayed on the UI 300. If selected, the button 304 may cause the first user to follow the first presented user 302. As an example, FIG. 4 illustrates a UI 400 depicting a followed first user. If selected, the button 304 may cause the first user to follow the first presented user. The button 304 may transform into a button 402. The button 402 may indicate that the first presented user 302 is already being followed by the first user. If selected again, the button 402 may cause the first user to un-follow the first presented user. If the user selects the button 402 again, the button 402 may transform so that is again resembles the button 304. The user may want to select the button 402 if, for example, they accidentally followed the first presented user 302 and wish to un-follow the first presented user 302.

Referring back to FIG. 3, the presented users may also include a subset of additional presented users 306a-n. The subset of additional presented users 306a-n may include any quantity of additional presented users. Each user of the subset of additional presented users 306a-n may be similar in some way to the first presented user 302. For example, the subset of additional presented users 306a-n may include those users that have similar followers as the first presented user 302, make content that is similar to the content made by the first presented user 302, and/or are associated with similar profile information as the profile associated with the first presented user 302 (e.g., descriptive biography, etc.).

An option to follow each user of the subset of additional presented users 306a-n may also be displayed in UI 300. For example, a plurality of buttons may be displayed on the UI 300. Each of the plurality of buttons may correspond to a particular user of the subset of additional presented users 306a-n. When a particular button is selected, this may cause the first user to follow the corresponding user of the subset of additional presented users 306a-n. By simultaneously displaying the first recommended user 302 and at least a portion of the subset of additional recommended users 306a-n, the first user may be more easily able to find users of interest to follow.

The first user may want to view a different presented user from the first presented user 302. The first user may swipe on the UI 300 to view a different presented user from the first presented user 302. For example, the first user may use his or her finger and/or a tool to swipe left or right on the interface. As the first user swipes left or right on the interface, one or more different presented users from the first presented user 302 may appear on the first carousel on the interface 108.

Figure 5:
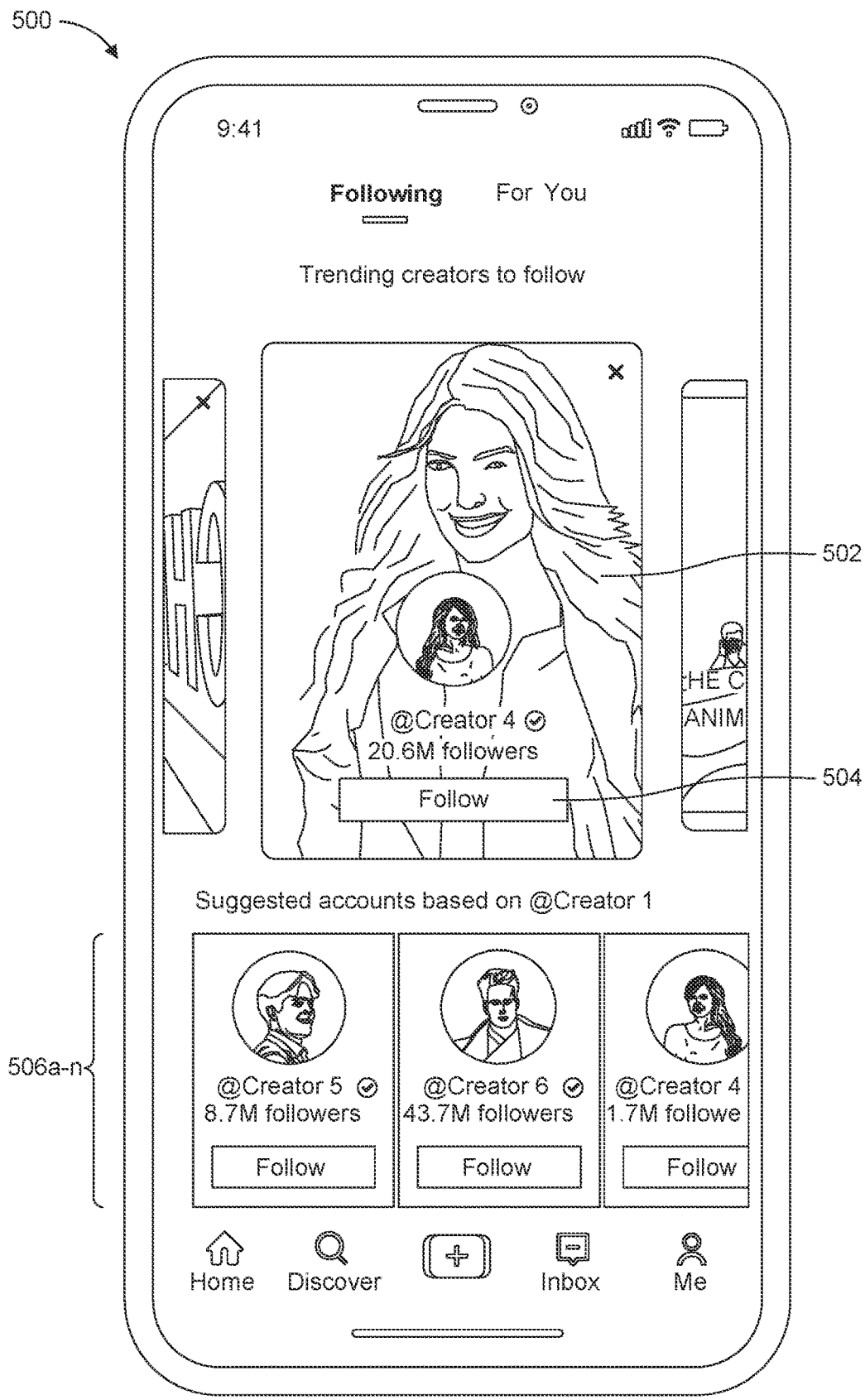
FIG. 5 shows another example user interface of presenting information associated with content creators in accordance with the present disclosure.

FIG. 5 illustrates a UI 500 depicting a second presented user 502. Information associated with the second presented user may be displayed on the UI 500. For example, profile information associated with the second recommended user may be displayed on the UI 500. The profile information may include a photo of the second presented user, a username, a name, a number of followers associated with the second presented user, and/or any other information associated with a profile of the second presented user. In addition to the profile information associated with the second presented user 502, a preview of the content created by the second presented user 502 may appear on the UI 500, such as behind the profile information associated with the second presented user 502. A button 504 may be displayed on the UI 500. If selected, the button 504 may cause the first user to follow the second presented user 502.

The UI 500 may also display a subset of additional presented users 506a-n. The subset of additional presented users 506a-n may include any quantity of additional presented users. Each user of the subset of additional presented users 506a-n may be similar in some way to the second presented user 502. For example, the subset of additional presented users 506a-n may include those users that have similar followers as the second presented user 502, make content that is similar to the content made by the second presented user 502, and/or are associated with similar profile information as the profile associated with the second presented user 502 (e.g., nickname, descriptive biography, etc.).

An option to follow each user of the subset of additional presented users 506a-n may also be displayed in UI 500. For example, a plurality of buttons may be displayed on the UI 500. Each of the plurality of buttons may correspond to a particular user of the subset of additional presented users 506a-n. When a particular button is selected, this may cause the first user to follow the corresponding user of the subset of additional presented users 506a-n. By simultaneously displaying the second presented user 502 and at least a portion of the subset of additional presented users 506a-n, the first user may be presented with a larger quantity of presented users. Accordingly, the first user may be more easily able to find users of interest to follow.

Figure 6:
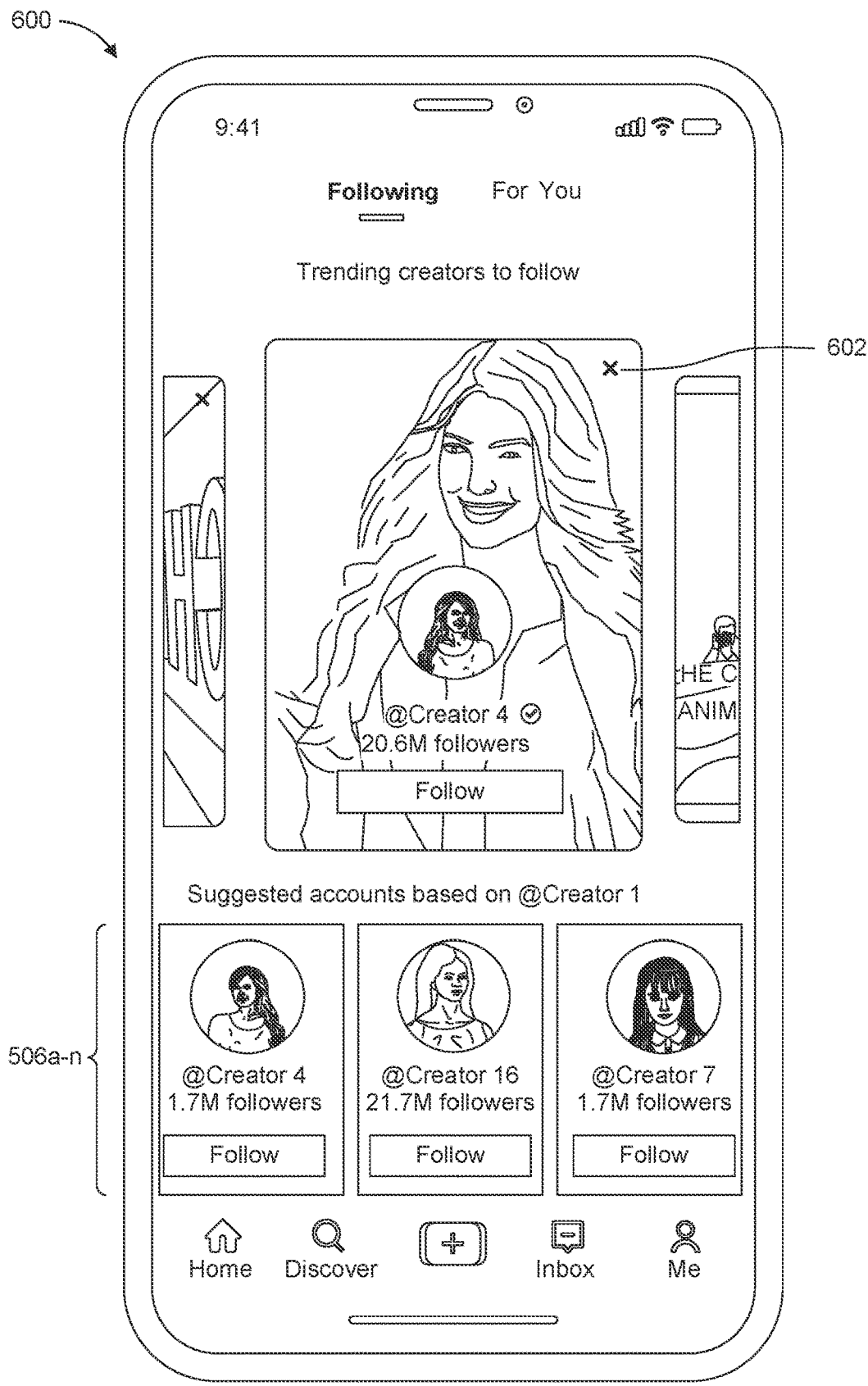
FIG. 6 shows another example user interface of presenting information associated with content creators in accordance with the present disclosure.

The first user may scroll through the list of additional presented users 506a-n in the second carousel. The first user may swipe on the UI 500 to scroll through the list of additional presented users 506a-n. For example, the first user may use his or her finger and/or a tool to swipe left or right on the second carousel of the interface. FIG. 6 illustrates a UI 600 depicting a different portion (e.g., different subset) of the additional recommended users 506a-n. If the first user is not interested in the second presented user 502 and/or if the first user is not interested in any of the additional presented users 506a-n, the first user may select the button 602. If selected, the button 602 may prompt a different presented user from the second presented user 502 to be displayed. Alternatively, if the first user is not interested in the second presented user 502 and/or if the first user is not interested in any of the additional presented users 506a-n, the first user may swipe on the UI 500 to view a different presented user from the second presented user 502.

Figure 7:
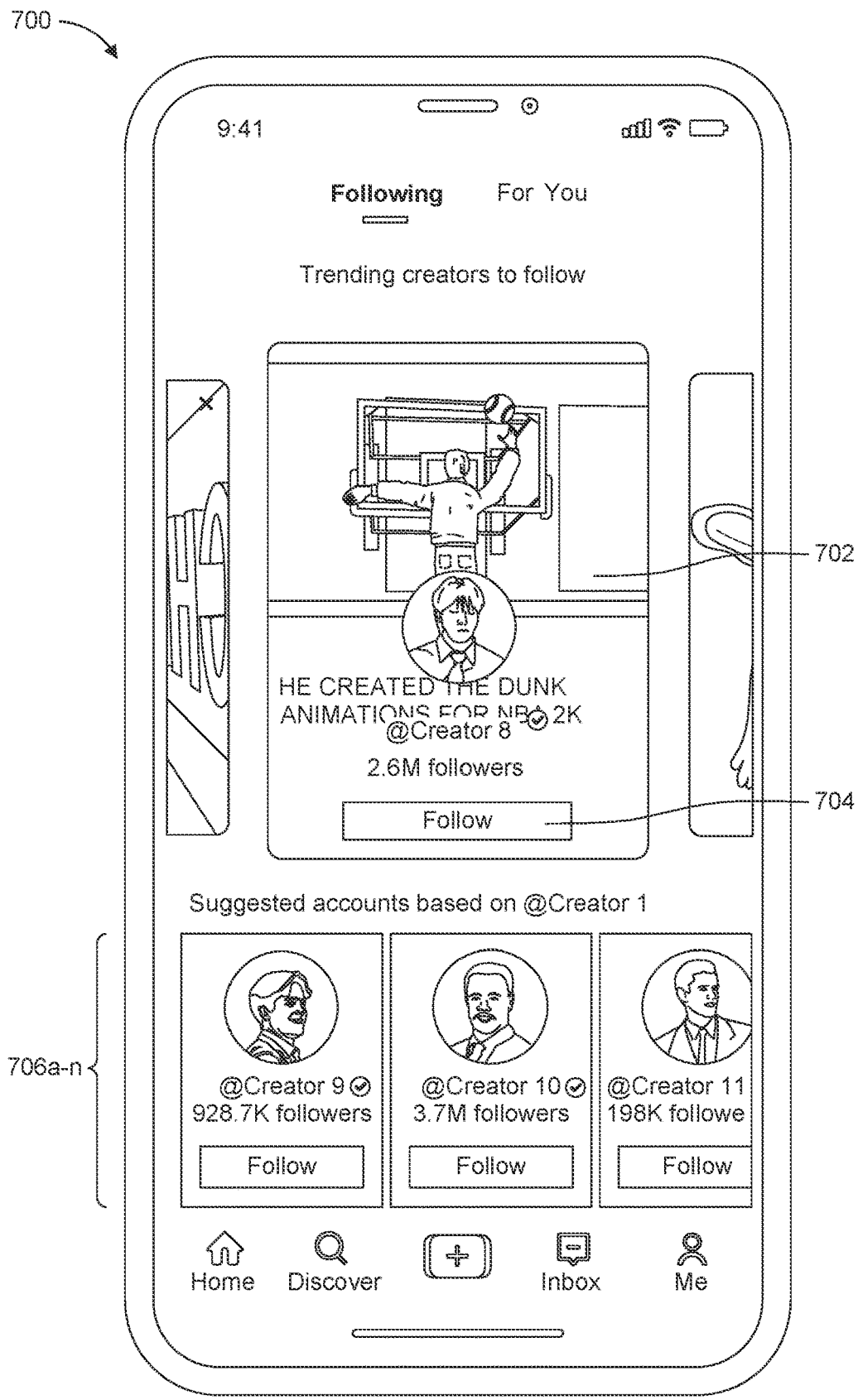
FIG. 7 shows another example user interface of presenting information associated with content creators in accordance with the present disclosure.

FIG. 7 illustrates a UI 700 depicting a third presented user 702. Information associated with the third presented user may be displayed on the UI 700. For example, profile information associated with the third presented user 702 may be displayed on the UI 700. The profile information may include a photo of the third presented user 702, a username, a name, a number of followers associated with the third presented user 702, and/or any other information associated with a profile of the third presented user 702. In addition to the profile information associated with the third presented user 702, a preview of the content created by the third presented user 702 may appear on the UI 700, such as behind the profile information associated with the third presented user 702. A button 704 may be displayed on the UI 700. If selected, the button 704 may cause the first user to follow the third presented user 702.

The UI 700 may also display a subset of additional presented users 706a-n. The subset of additional presented users 706a-n may include any quantity of additional presented users. Each user of the subset of additional presented users 706a-n may be similar in some way to the third presented user 702. For example, the subset of additional presented users 706a-n may include those users that have similar followers as the third presented user 702, make content that is similar to the content made by the third recommended user 702, and/or are associated with similar profile information as the profile associated with the third presented user 702 (e.g., nickname, descriptive biography, etc.).

An option to follow each user of the subset of additional presented users 706a-n may also be displayed in UI 700. For example, a plurality of buttons may be displayed on the UI 700. Each of the plurality of buttons may correspond to a particular user of the subset of additional presented users 706a-n. When a particular button is selected, this may cause the first user to follow the corresponding user of the subset of additional presented users 706a-n. By simultaneously displaying the third presented user 702 and at least a portion of the subset of additional presented users 706a-n, the first user may be presented with a larger quantity of presented users. Accordingly, the first user may be more easily able to find users of interest to follow.

Figure 8:
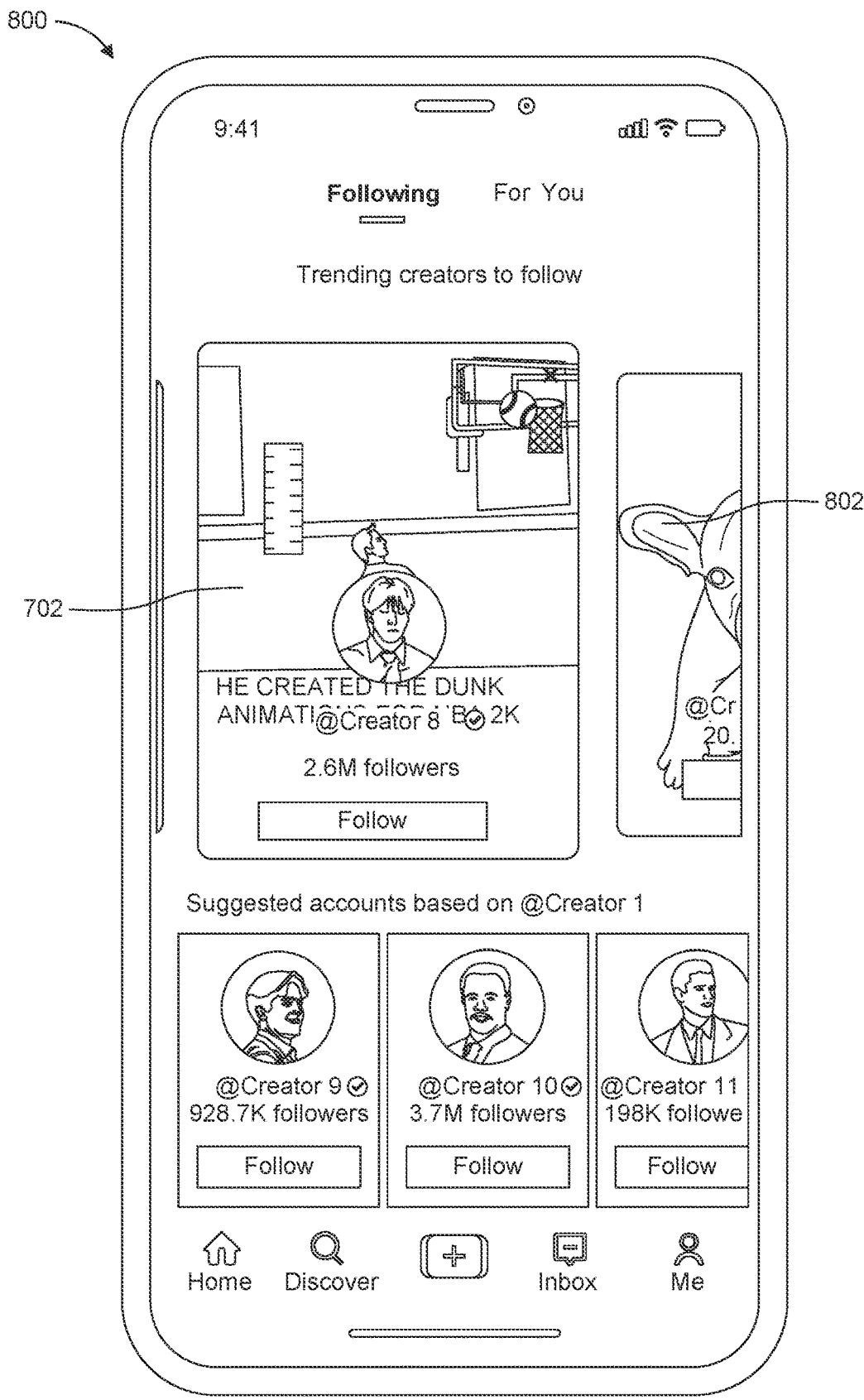
FIG. 8 shows another example user interface of presenting information associated with content creators in accordance with the present disclosure.

If the first user is not interested in the third presented user 702 and/or if the first user is not interested in any of the additional presented users 706a-n, the first user may swipe on first carousel of the UI 700 to view a different presented user from the third recommended user 702. For example, the first user may swipe left on the first carousel of the UI 700 to view a different presented user from the third presented user 702. For example, the first user may swipe left on the first carousel of the UI 700 to view a fourth presented user 802. FIG. 8 illustrates a transition 800 between the UI 700 and the UI 900. The fourth presented user 802 enters the interface as the third presented user 702 exits the interface.

Figure 9:
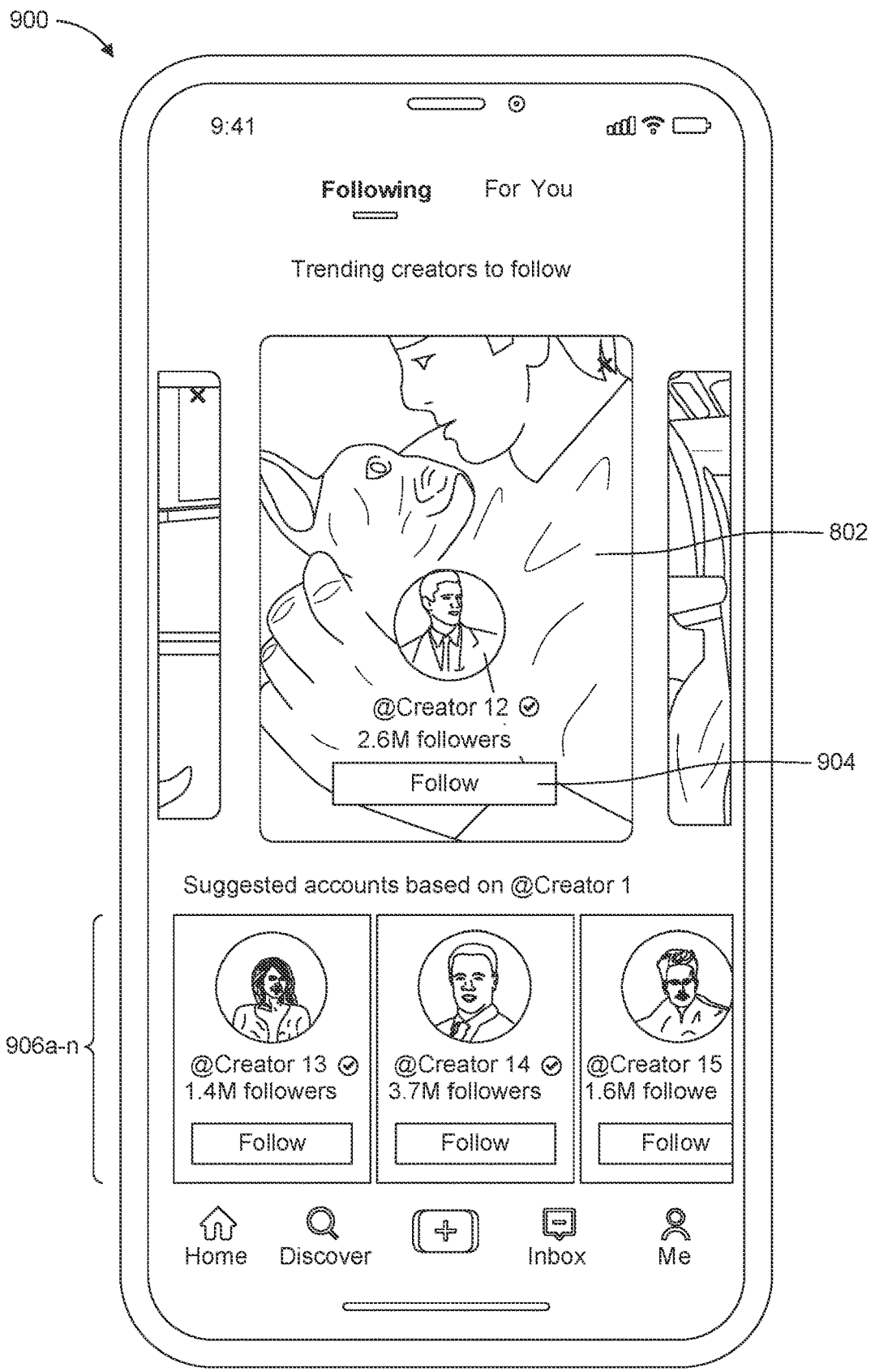
FIG. 9 shows another example user interface of presenting information associated with content creators in accordance with the present disclosure.

FIG. 9 illustrates the UI 900 depicting the fourth presented user 802. Information associated with the fourth presented user 802 may be displayed on the UI 900. For example, profile information associated with the fourth presented user 802 may be displayed on the UI 900. The profile information may include a photo of the fourth presented user 802, a username, a name, a number of followers associated with the fourth presented user 802, and/or any other information associated with a profile of the fourth presented user 802. In addition to the profile information associated with the fourth presented user 802, a preview of the content created by the fourth presented user 802 may appear on the UI 900, such as behind the profile information associated with the fourth presented user 802. A button 904 may be displayed on the UI 900. If selected, the button 904 may cause the first user to follow the fourth presented user 802.

The UI 900 may also display a subset of additional presented users 906*a-n*. The subset of additional presented users 906*a-n* may include any quantity of additional presented users. Each user of the subset of additional presented users 906*a-n* may be similar in some way to the fourth presented user 802. For example, the subset of additional presented users 906*a-n* may include those users that have similar followers as the fourth presented user 802, make content that is similar to the content made by the fourth presented user 802, and/or are associated with similar profile information as the profile associated with the fourth presented user 802 (e.g., nickname, descriptive biography, etc.).

An option to follow each user of the subset of additional presented users 906*a-n* may also be displayed in UI 900. For example, a plurality of buttons may be displayed on the UI 900. Each of the plurality of buttons may correspond to a particular user of the subset of additional presented users 906*a-n*. When a particular button is selected, this may cause the first user to follow the corresponding user of the subset of additional presented users 906*a-n*.

Figure 10:
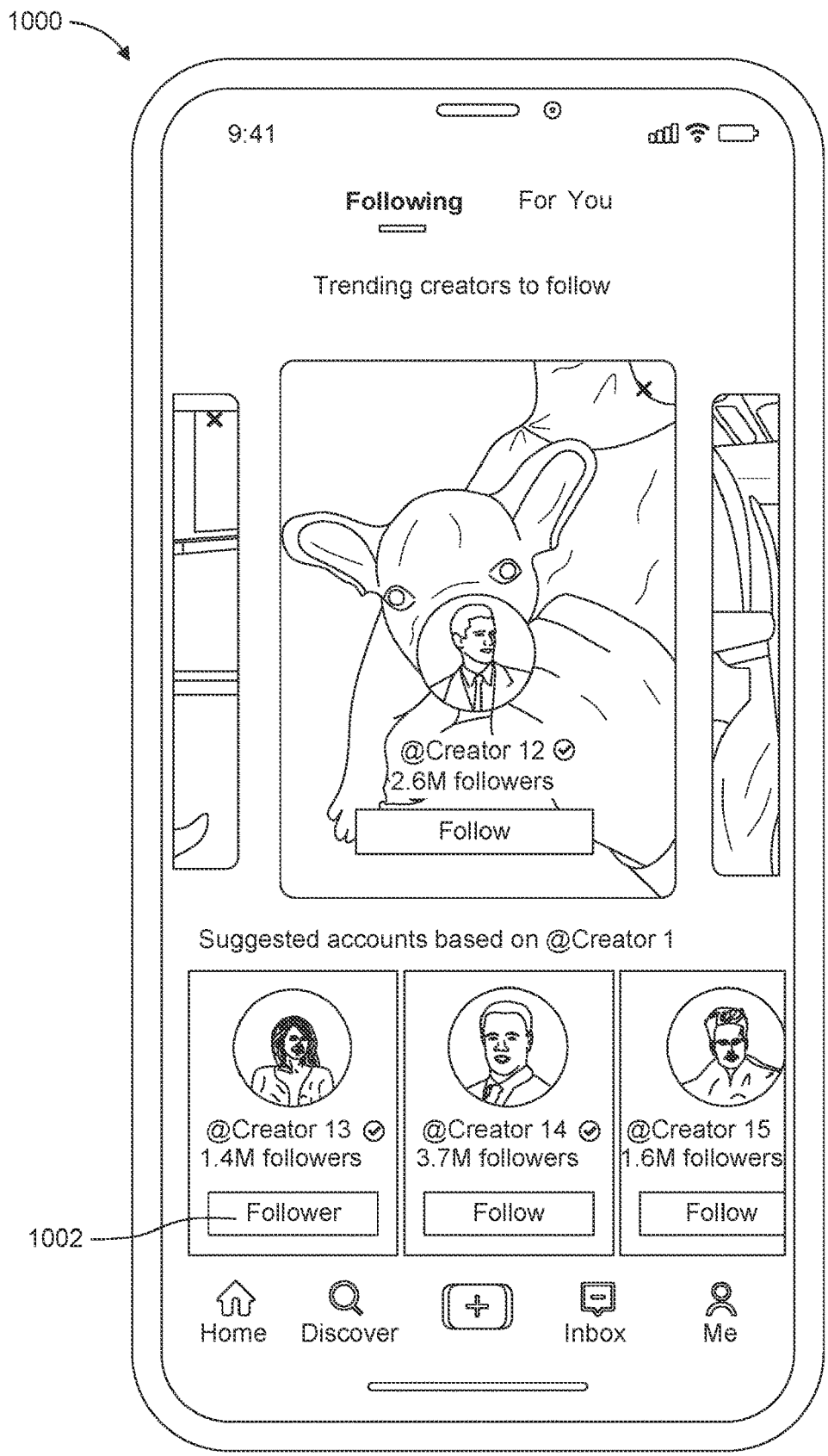
FIG. 10 shows another example user interface of presenting information associated with content creators in accordance with the present disclosure.

As an example, FIG. 10 illustrates a UI 1000 depicting a followed user of the subset of additional presented users 906*a-n*. For example, if selected, the button corresponding to the first user of the subset of additional presented users 906*a-n* may cause the first user to follow the certain user A of the subset of additional recommended users 906*a-n*. The button may transform into a button 1002. The button 1002 may indicate that the certain user A of the subset of additional recommended users 906*a-n* is being followed by the first user. If selected again, the button 1002 may cause the first user to un-follow the first user of the subset of additional presented users 906*a-n*. The user may want to select the button 1002 if, for example, they accidentally followed the first user of the subset of additional presented users 906*a-n* and wish to un-follow the first user of the subset of additional presented users 906*a-n*. By simultaneously displaying the fourth presented user 802 and at least a portion of the subset of additional presented users 906*a-n*, the first user may be more easily able to find users of interest to follow.

FIG. 11 illustrates an example process 1100 that may be performed by an application installed on a user device (e.g., the application 106 installed on the client device 104) and/or a video service (e.g., the video service 112). Although depicted as a sequence of operations in FIG. 11, those of ordinary skill in the art will appreciate that various embodiments may add, remove, reorder, or modify the depicted operations.

At 1102, information about a first subset of users may be received. The first subset of users may be selected based on a likelihood that a first user would find them of interest according to information about the first user. For example, the first subset of users may be selected by a video service or an application on a user device. In some examples, an application installed on a user device (e.g., the application 106 installed on the client device 104) may be configured to select the first subset of users based on a likelihood that a first user would find them of interest according to information about the first user. In other examples, a video service (e.g., the video service 112) may be configured to provide, to a first user of the video service, a first subset of other users. The first subset may include any number of other users. Each user of the first subset may create and upload content, such as short videos, to the video service. The video service may determine the other users in the first subset based on information associated with the first user's profile.

In an embodiment, the first subset of users may be organized in a carousel on the interface. For example, the first subset of the users may be displayed in the first carousel on the first portion of the interface. The first user may be able to swipe through the users in the first subset, one-by-one. For example, the first user may use his or her finger and/or a tool to swipe left or right in the first carousel on the interface.

As the first user swipes left or right on the interface, different users of the first subset of users may appear on the interface. At 1104, information about a second user among the first subset of users may be displayed in a first area of a user interface. The information associated with the second user may include profile information (e.g., photo, username, etc.) associated with the second user. As another example, the information associated with the second user may include content created by the second user. In particular, a short video or a portion of a short video created by the second user may be played back (e.g., output) on the interface. Profile information and a content preview may be displayed together for the second user. The first area (e.g., portion) may be a top portion, bottom portion, right portion, left portion, etc. of the interface. An option to follow the second user may also be displayed in the first area of the user interface. For example, a button, that when selected causes the first user to follow the second user, may be displayed in the first area of the user interface. FIG. 13, discussed below, provides additional detail regarding 1104.

At 1106, information about a plurality of users among a second subset of users may be displayed in a second area of the user interface while the information about the second user is being displayed in the first area of the user interface. The second subset of users may be associated with the second user. The second subset of users may include any number of users. The second subset of users may include those users that are similar in some manner to the second user. For example, the second subset of users may include those users that have similar followers as the second user, make content that is similar to the content made by the second user, and/or are associated with similar profile information to the second user's profile (e.g., nickname, descriptive biography, etc.). The information about the second user and the information about the plurality of users among the second subset of users may be simultaneously displayed on the interface. For example, as discussed above, the first area (e.g., portion) may be a top portion, bottom portion, right portion, left portion, etc. of the interface. The second area may be any area or portion of the interface that is different from the first portion. By simultaneously displaying the second user and the plurality of users among the second subset of users on the same interface, the first user may be more easily able to find users of interest to follow.

To view a different user from the first subset of users than the second user, the first user may interact with the interface. For example, the first user may swipe through the users in the first subset of users, one-by-one. At 1108, it may be determined that the first user has a desire to review information about a third user among the first subset of users based on user input. The third user may be different from the second user. For example, the first user may use his or her finger and/or a tool to swipe left or right on the interface. As the first user swipes left or right on the interface, different users of the first subset of users may appear on the interface. The information associated with the second user may begin to move off or disappear from the interface, and information associated with the third user may begin to move onto or appear on the interface.

At 1110, information about the third user among the first subset of users may be displayed in the first area of the user interface in response to a determination that the first user has the desire to review the information about the third user. For example, information associated with the profile (e.g., photo, username, etc.) of the third user may appear on the interface as the first user swipes on the interface. As another example, a preview of the content created by the third user may appear on the interface as the first user swipes on the interface. In particular, a short video or a portion of a short video created by the third user may be played back (e.g., output) on the interface. Profile information and a content preview may be displayed together for the third user as the first user swipes on the interface. An option to follow the third user may also be displayed in the first area of the user interface. For example, a button, that when selected causes the first user to follow the third user, may be displayed in the first area of the user interface.

At 1112, information about a plurality of users among a third subset of users may be displayed in the second area of the user interface while the information about the third user is being displayed in the first area of the user interface. The third subset of users may be associated with the third user. The third subset of users may include any number of users. The third subset of users may include those users that are similar in some manner to the third user. For example, the third subset of users may include those users that have similar followers as the third user, make content that is similar to the content made by the third user, and/or are associated with similar profile information to the third user's profile (e.g., nickname, descriptive biography, etc.). The information about the third user and the information about the plurality of users among the third subset of users may be simultaneously displayed on the interface. For example, as discussed above, the first area (e.g., portion) may be a top portion, bottom portion, right portion, left portion, etc. of the interface. The second area may be any area or portion of the interface that is different from the first portion. By simultaneously displaying the third user and the plurality of users among the third subset of users on the same interface, the first user may be more easily able to find users of interest to follow.

FIG. 12 illustrates an example process 1200 that may be performed by an application installed on a user device (e.g., the application 106 installed on the client device 104) and/or a video service (e.g., the video service 112). Although depicted as a sequence of operations in FIG. 12, those of ordinary skill in the art will appreciate that various embodiments may add, remove, reorder, or modify the depicted operations.

At 1202, information about a first subset of users may be received. The first subset of users may be selected based on a likelihood that a first user would find them of interest according to information about the first user. For example, the first subset of users may be selected by a video service or an application on a user device. In some examples, an application installed on a user device (e.g., the application 106 installed on the client device 104) may be configured to select the first subset of users based on a likelihood that a first user would find them of interest according to information about the first user. In other examples, a video service (e.g., the video service 112) may be configured to provide, to a first user of the video service, a first subset of other users. The first subset may include any number of other users. Each user of the first subset may create and upload content, such as short videos, to the video service. The video service may determine the other users in the first subset based on information associated with the first user's profile.

In an embodiment, the first subset of users may be organized in a carousel on the interface. For example, the first subset of the users may be displayed in the first carousel on the first portion of the interface. The first user may be able to swipe through the users in the first subset, one-by-one. For example, the first user may use his or her finger and/or a tool to swipe left or right in the first carousel on the interface.

As the first user swipes left or right on the interface, different users of the first subset of users may appear on the interface. At 1204, information about a second user among the first subset of users may be displayed in a first area of a user interface. The information associated with the second user may include profile information (e.g., photo, username, etc.) associated with the second user. As another example, the information associated with the second user may include content created by the second user. In particular, a short video or a portion of a short video created by the second user may be played back (e.g., output) on the interface. Profile information and a content preview may be displayed together for the second user. The first area (e.g., portion) may be a top portion, bottom portion, right portion, left portion, etc. of the interface. An option to follow the second user may also be displayed in the first area of the user interface. For example, a button, that when selected causes the first user to follow the second user, may be displayed in the first area of the user interface. FIG. 13, discussed below, provides additional detail regarding 1204.

At 1206, information about a plurality of users among a second subset of users may be displayed in a second area of the user interface while the information about the second user is being displayed in the first area of the user interface. The second subset of users may be associated with the second user. The second subset of users may include any number of users. The second subset of users may include those users that are similar in some manner to the second user. For example, the second subset of users may include those users that have similar followers as the second user, make content that is similar to the content made by the second user, and/or are associated with similar profile information to the second user's profile (e.g., nickname, descriptive biography, etc.). The information about the second user and the information about the plurality of users among the second subset of users may be simultaneously displayed on the interface. For example, as discussed above, the first area (e.g., portion) may be a top portion, bottom portion, right portion, left portion, etc. of the interface. The second area may be any area or portion of the interface that is different from the first portion. By simultaneously displaying the second user and the plurality of users among the second subset of users on the same interface, the first user may be more easily able to find users of interest to follow.

At 1208, it may be determined that the first user has a desire to review information about a different plurality of users among the second subset of users based on user input. For example, the first user may be able to swipe through the second subset of users, one-by-one, and accordingly, different groups of the second subset of users can be presented in the second carousel in accordance with the swiping of the first user. For example, the first user may use his or her finger and/or a tool to swipe left or right on the interface, such as the second area of the interface.

As the first user swipes left or right on the interface, information about a different plurality of users among the second subset of users may appear on the interface. At 1210, information about the different plurality of users may be displayed among the second subset of users in the second area of the user interface while the information about the second user is being displayed in the first area of the user interface. As discussed above, by simultaneously displaying the second user and the different plurality of users among the second subset of users on the same interface, the first user may be more easily able to find users of interest to follow.

To view a different user from the first subset of users than the second user, the first user may interact with the interface. For example, the first user may swipe through the users in the first subset of users, one-by-one. At 1212, it may be determined that the first user has a desire to review information about a third user among the first subset of users based on user input. The third user may be different from the second user. For example, the first user may use his or her finger and/or a tool to swipe left or right on the interface. As the first user swipes left or right on the interface, different users of the first subset of users may appear on the interface. The information associated with the second user may begin to move off or disappear from the interface, and information associated with the third user may begin to move onto or appear on the interface.

At 1214, information about the third user among the first subset of users may be displayed in the first area of the user interface in response to a determination that the first user has the desire to review the information about the third user. For example, information associated with the profile (e.g., photo, username, etc.) of the third user may appear on the interface as the first user swipes on the interface. As another example, a preview of the content created by the third user may appear on the interface as the first user swipes on the interface. In particular, a short video or a portion of a short video created by the third user may be played back (e.g., output) on the interface. Profile information and a content preview may be displayed together for the third user as the first user swipes on the interface. An option to follow the third user may also be displayed in the first area of the user interface. For example, a button, that when selected causes the first user to follow the third user, may be displayed in the first area of the user interface.

At 1216, information about a plurality of users among a third subset of users may be displayed in the second area of the user interface while the information about the third user is being displayed in the first area of the user interface. The third subset of users may be associated with the third user. The third subset of users may include any number of users. The third subset of users may include those users that are similar in some manner to the third user. For example, the third subset of users may include those users that have similar followers as the third user, make content that is similar to the content made by the third user, and/or are associated with similar profile information to the third user's profile (e.g., nickname, descriptive biography, etc.). The information about the third user and the information about the plurality of users among the third subset of users may be simultaneously displayed on the interface. For example, as discussed above, the first area (e.g., portion) may be a top portion, bottom portion, right portion, left portion, etc. of the interface. The second area may be any area or portion of the interface that is different from the first portion. By simultaneously displaying the third user and the plurality of users among the third subset of users on the same interface, the first user may be more easily able to find users of interest to follow.

FIG. 13 illustrates an example process 1300 that may be performed by an application installed on a user device (e.g., the application 106 installed on the client device 104) and/or a video service (e.g., the video service 112). For example, the process 1300 may be performed to display information about a second user among the first subset of users may be displayed in a first area (e.g., 1104 of FIGS. 11 and/or 1204 of FIG. 12). Although depicted as a sequence of operations in FIG. 13, those of ordinary skill in the art will appreciate that various embodiments may add, remove, reorder, or modify the depicted operations.

As discussed above, the first subset of registered users can be presented in the first area of the interface, such as in a first carousal. At 1302, a profile image of the second user and content associated with the second user may be displayed. For example, the profile image of the second user may be overlaid above the content. In embodiments, the information associated with the second user can be presented in a form of image card with a profile image displayed over a video that may be generated by the second user. In embodiments, the information associated with the second user can be presented in a form of image card with a profile image displayed over a static background. At 1304, the content may be automatically played when the information about the second user is displayed in the first area of the user interface.

At 1306, an interface element may be displayed adjacent to the profile image of the second user. For example, an option to follow the second user may also be displayed in the first area of the user interface adjacent to the profile image of the second user. For example, a button, that when selected causes the first user to follow the second user, may be displayed in the first area of the user interface adjacent to the profile image of the second user. At 1308, a status of the interface element may be changed in response to receiving user input on the interface element. For example, the button may transform into a different button indicating that the second user is being followed by the first user.

Figure 14:
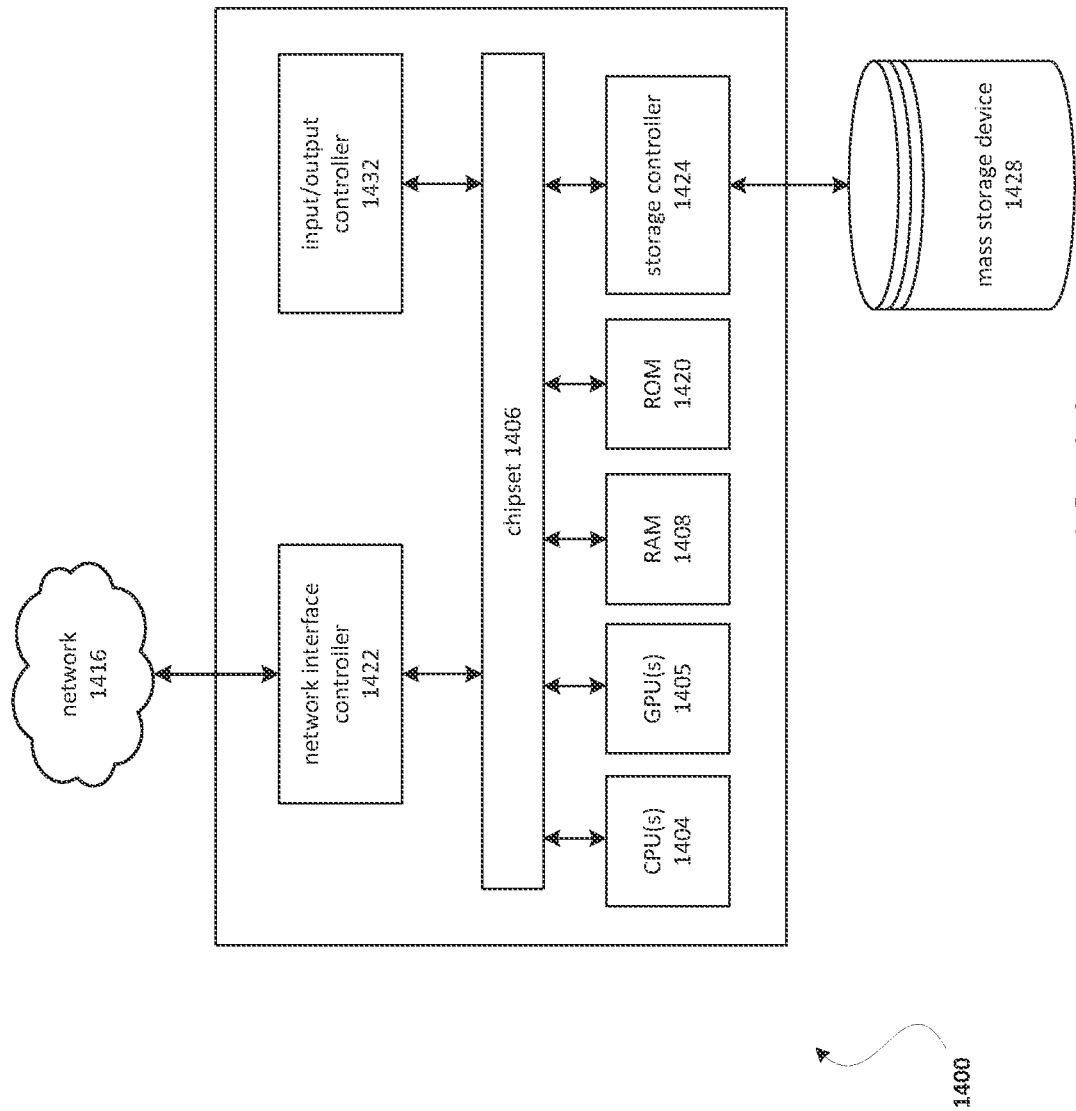
FIG. 14 shows an example computing device which may be used to perform any of the techniques disclosed herein.

FIG. 14 illustrates a computing device that may be used in various aspects, such as the services, networks, modules, and/or devices depicted in FIG. 1. With regard to the example architecture of FIG. 1, the video service 142, cloud network 102, client device 104*a*-*d* (collectively client device 104), and/or network 120 may each be implemented by one or more instance of a computing device 1400 of FIG. 14. The computer architecture shown in FIG. 14 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1400 may include a baseboard, or "motherboard," which is a printed circuit board to which a multitude of components or devices may be connected by way of a system bus or other electrical communication paths. One or more central processing units (CPUs) 1404 may operate in conjunction with a chipset 1406. The CPU(s) 1404 may be standard programmable processors that perform arithmetic and logical operations necessary for the operation of the computing device 1400.

The CPU(s) 1404 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1404 may be augmented with or replaced by other processing units, such as GPU(s) 1405. The GPU(s) 1405 may comprise processing units specialized for but not necessarily limited to highly parallel computations, such as graphics and other visualization-related processing.

A chipset 1406 may provide an interface between the CPU(s) 1404 and the remainder of the components and devices on the baseboard. The chipset 1406 may provide an interface to a random-access memory (RAM) 1408 used as the main memory in the computing device 1400. The chipset 1406 may further provide an interface to a computer-readable storage medium, such as a read-only memory (ROM) 1420 or non-volatile RAM (NVRAM) (not shown), for storing basic routines that may help to start up the computing device 1400 and to transfer information between the various components and devices. ROM 1420 or NVRAM may also store other software components necessary for the operation of the computing device 1400 in accordance with the aspects described herein.

The computing device 1400 may operate in a networked environment using logical connections to remote computing nodes and computer systems through local area network (LAN). The chipset 1406 may include functionality for providing network connectivity through a network interface controller (NIC) 1422, such as a gigabit Ethernet adapter. A NIC 1422 may be capable of connecting the computing device 1400 to other computing nodes over a network 1416. It should be appreciated that multiple NICs 1422 may be present in the computing device 1400, connecting the computing device to other types of networks and remote computer systems.

The computing device 1400 may be connected to a mass storage device 1228 that provides non-volatile storage for the computer. The mass storage device 1228 may store system programs, application programs, other program modules, and data, which have been described in greater detail herein. The mass storage device 1228 may be connected to the computing device 1400 through a storage controller 1424 connected to the chipset 1406. The mass storage device 1228 may consist of one or more physical storage units. The mass storage device 1228 may comprise a management component 1210. A storage controller 1424 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1400 may store data on the mass storage device 1228 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1228 is characterized as primary or secondary storage and the like.

For example, the computing device 1400 may store information to the mass storage device 1228 by issuing instructions through a storage controller 1424 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1400 may further read information from the mass storage device 1228 by detecting the physical states or characteristics of one or more particular locations within the physical storage units.

In addition to the mass storage device 1228 described above, the computing device 1400 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1400.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1228 depicted in FIG. 14, may store an operating system utilized to control the operation of the computing device 1400. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1228 may store other system or application programs and data utilized by the computing device 1400.

The mass storage device 1228 or other computer-readable storage media may also be encoded with computer-executable instructions, which, when loaded into the computing device 1400, transforms the computing device from a general-purpose computing system into a special-purpose computer capable of implementing the aspects described herein. These computer-executable instructions transform the computing device 1400 by specifying how the CPU(s) 1404 transition between states, as described above. The computing device 1400 may have access to computer-readable storage media storing computer-executable instructions, which, when executed by the computing device 1400, may perform the methods described herein.

A computing device, such as the computing device 1400 depicted in FIG. 14, may also include an input/output controller 1432 for receiving and processing input from a number of input devices, such as a keyboard, a mouse, a touchpad, a touch screen, an electronic stylus, or other type of input device. Similarly, an input/output controller 1432 may provide output to a display, such as a computer monitor, a flat-panel display, a digital projector, a printer, a plotter, or other type of output device. It will be appreciated that the computing device 1400 may not include all of the components shown in FIG. 14, may include other components that are not explicitly shown in FIG. 14, or may utilize an architecture completely different than that shown in FIG. 14.

As described herein, a computing device may be a physical computing device, such as the computing device 1400 of FIG. 14. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method, comprising:
receiving information about a first subset of users by a client computing device associated with a first user, wherein the first subset of users is selected based on a likelihood that the first user would find them of interest according to information about the first user, and wherein the first subset of users are content creators;
displaying information about a second user among the first subset of users in a first area of a user interface of the client computing device, wherein the second user is a content creator who has created and uploaded content to a content service, and wherein the information about the second user comprises a preview of content created by the second user;
simultaneously displaying information about a plurality of users among a second subset of users in a second area of the user interface while displaying the information about the second user in the first area of the user interface, wherein the second subset of users is associated with the second user;
determining whether the first user has a desire to review information about a third user among the first subset of users based on user input, wherein the third user is different from the second user;
displaying information about the third user among the first subset of users in the first area of the user interface in response to a determination that the first user has the desire to review the information about the third user, wherein the displaying information about the third user among the first subset of users in the first area of the user interface further comprises moving the information about the third user onto the user interface while moving the information about the second user off the user interface, wherein the third user is also a content creator who has created and uploaded content to the content service, and wherein the information about the third user comprises a preview of content created by the third user; and
simultaneously displaying information about a plurality of users among a third subset of users in the second area of the user interface while displaying the information about the third user in the first area of the user interface, wherein the third subset of users is associated with the third user.

2. The method of claim 1, wherein the second subset of users is determined based on at least one similar attribute between the second user and the second subset of users, and wherein the third subset of users is determined based on at least one similar attribute between the third user and the third subset of users.

3. The method of claim 1, further comprising:
determining that the first user has a desire to review information about a different plurality of users among the second subset of users based on user input; and
displaying information about the different plurality of users among the second subset of users in the second area of the user interface while displaying the information about the second user in the first area of the user interface.

4. The method of claim 1, wherein the displaying information about a second user among the first subset of users in a first area of a user interface further comprises displaying a profile image of the second user and content associated with the second user, the profile image overlaid above the content.

5. The method of claim 4, further comprising:
automatically playing the content when the information about the second user is displayed in the first area of the user interface.

6. The method of claim 4, further comprising:
displaying an interface element adjacent to the profile image of the second user; and
changing a status of the interface element in response to receiving user input on the interface element.

7. The method of claim 1, wherein the displaying information about a plurality of users among a second subset of users in a second area of the user interface further comprises displaying a profile image corresponding to each of the plurality of users over a static background in the second area of the user interface.

8. The method of claim 1, wherein the first area is adjacent to the second area, and wherein a size of the first area is greater than a size of the second area.

9. A system, comprising:
at least one processor; and
at least one memory communicatively coupled to the at least one processor and comprising computer-readable instructions that upon execution by the at least one processor cause the at least one processor to perform operations comprising:

receiving information about a first subset of users, wherein the first subset of users is selected based on a likelihood that a first user would find them of interest according to information about the first user, and wherein the first subset of users are content creators;

displaying information about a second user among the first subset of users in a first area of a user interface, wherein the second user is a content creator who has created and uploaded content to a content service, and wherein the information about the second user comprises a preview of content created by the second user;

simultaneously displaying information about a plurality of users among a second subset of users in a second area of the user interface while displaying the information about the second user in the first area of the user interface, wherein the second subset of users is associated with the second user;

determining whether the first user has a desire to review information about a third user among the first subset of users based on user input, wherein the third user is different from the second user;

displaying information about the third user among the first subset of users in the first area of the user interface in response to a determination that the first user has the desire to review the information about the third user, wherein the displaying information about the third user among the first subset of users in the first area of the user interface further comprises moving the information about the third user onto the user interface while moving the information about the second user off the user interface, wherein the third user is also a content creator who has created and uploaded content to the content service, and wherein the information about the third user comprises a preview of content created by the third user; and simultaneously displaying information about a plurality of users among a third subset of users in the second area of the user interface while displaying the information about the third user in the first area of the user interface, wherein the third subset of users is associated with the third user.

10. The system of claim 9, wherein the second subset of users is determined based on at least one similar attribute between the second user and the second subset of users, and wherein the third subset of users is determined based on at least one similar attribute between the third user and the third subset of users.

11. The system of claim 9, the operations further comprising:

determining that the first user has a desire to review information about a different plurality of users among the second subset of users based on user input; and displaying information about the different plurality of users among the second subset of users in the second area of the user interface while displaying the information about the second user in the first area of the user interface.

12. The system of claim 9, wherein the displaying information about a second user among the first subset of users in a first area of a user interface further comprises displaying a profile image of the second user and content associated with the second user, the profile image overlaid above the content.

13. The system of claim 12, the operations further comprising:

automatically playing the content when the information about the second user is displayed in the first area of the user interface.

14. The system of claim 12, the operations further comprising:

displaying an interface element adjacent to the profile image of the second user; and changing a status of the interface element in response to receiving user input on the interface element.

15. A non-transitory computer-readable storage medium, storing computer-readable instructions that upon execution by a computing device cause the computing device to perform operations comprising:

receiving information about a first subset of users, wherein the first subset of users is selected based on a likelihood that a first user would find them of interest according to information about the first user, and wherein the first subset of users are content creators;

displaying information about a second user among the first subset of users in a first area of a user interface, wherein the second user is a content creator who has created and uploaded content to a content service, and wherein the information about the second user comprises a preview of content created by the second user;

simultaneously displaying information about a plurality of users among a second subset of users in a second area of the user interface while displaying the information about the second user in the first area of the user interface, wherein the second subset of users is associated with the second user;

determining whether the first user has a desire to review information about a third user among the first subset of users based on user input, wherein the third user is different from the second user;

displaying information about the third user among the first subset of users in the first area of the user interface in response to a determination that the first user has the desire to review the information about the third user, wherein the displaying information about the third user among the first subset of users in the first area of the user interface further comprises moving the information about the third user onto the user interface while moving the information about the second user off the user interface, wherein the third user is also a content creator who has created and uploaded content to the content service, and wherein the information about the third user comprises a preview of content created by the third user; and simultaneously displaying information about a plurality of users among a third subset of users in the second area of the user interface while displaying the information about the third user in the first area of the user interface, wherein the third subset of users is associated with the third user.

16. The non-transitory computer-readable storage medium of claim 15, wherein the second subset of users is determined based on at least one similar attribute between the second user and the second subset of users, and wherein the third subset of users is determined based on at least one similar attribute between the third user and the third subset of users.

17. The non-transitory computer-readable storage medium of claim 15, the operations further comprising:

determining that the first user has a desire to review information about a different plurality of users among the second subset of users based on user input; and displaying information about the different plurality of users among the second subset of users in the second area of the user interface while displaying the information about the second user in the first area of the user interface.

18. The non-transitory computer-readable storage medium of claim 15, wherein the displaying information about a second user among the first subset of users in a first area of a user interface further comprises displaying a profile image of the second user and content associated with the second user, the profile image overlaid above the content.

19. The non-transitory computer-readable storage medium of claim 18, the operations further comprising:
automatically playing the content when the information about the second user is displayed in the first area of the user interface.

20. The non-transitory computer-readable storage medium of claim 18, the operations further comprising:
displaying an interface element adjacent to the profile image of the second user; and
changing a status of the interface element in response to receiving user input on the interface element.

* * * * *